US012442687B2

(12) United States Patent
Vaartstra et al.

(10) Patent No.: US 12,442,687 B2
(45) Date of Patent: Oct. 14, 2025

(54) OPTICAL SENSOR TRANSPARENT COVER WITH ARRAY CONTACT GRID

(71) Applicant: SEMICONDUCTOR COMPONENTS INDUSTRIES, LLC, Phoenix, AZ (US)

(72) Inventors: Brian Anthony Vaartstra, Nampa, ID (US); Larry Duane Kinsman, Redding, CA (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 245 days.

(21) Appl. No.: 18/056,524

(22) Filed: Nov. 17, 2022

(65) Prior Publication Data
US 2024/0167873 A1 May 23, 2024

(51) Int. Cl.
*G01J 3/28* (2006.01)
*G01D 5/24* (2006.01)

(52) U.S. Cl.
CPC .............. *G01J 3/2803* (2013.01); *G01D 5/24* (2013.01)

(58) Field of Classification Search
CPC ........ G01J 3/2803; G01J 3/0297; G01D 5/24; H10F 39/804; H10F 39/011; H10F 39/182; H10F 39/8063; G01L 1/142

USPC .......................................................... 356/222
See application file for complete search history.

(56) References Cited

U.S. PATENT DOCUMENTS

| 10,297,627 | B1 | 5/2019 | Qian et al. |
| 2004/0002179 | A1 | 1/2004 | Barton et al. |
| 2017/0168611 | A1* | 6/2017 | Jang ...................... G06F 3/0444 |
| 2020/0218392 | A1 | 7/2020 | He et al. |
| 2020/0273897 | A1 | 8/2020 | Yamamoto et al. |
| 2020/0388643 | A1* | 12/2020 | Ma ....................... H10F 39/8053 |
| 2021/0313300 | A1* | 10/2021 | Park ..................... H01L 23/3142 |
| 2023/0063200 | A1* | 3/2023 | Wu .......................... H01L 24/20 |
| 2023/0207592 | A1* | 6/2023 | Watanabe ............. H10F 39/024 257/572 |

* cited by examiner

Primary Examiner — Md M Rahman
(74) Attorney, Agent, or Firm — Brake Hughes Bellermann LLP

(57) ABSTRACT

A package includes an optical sensor die, a support grid structure disposed on the optical sensor die, and an optically transparent cover attached to the support grid structure. A surface of the optical sensor die includes an optically active surface area (OASA) and an edge surface portion lying outside a perimeter of the OASA. The support grid structure disposed on the surface of the optical sensor die includes at least one pillar disposed within the OASA and an edge block disposed on the edge surface portion lying outside the perimeter of the OASA. The optically transparent cover is supported by the support grid structure at a height above the optical sensor die while maintaining an air gap between the optically transparent cover and the OASA.

23 Claims, 23 Drawing Sheets

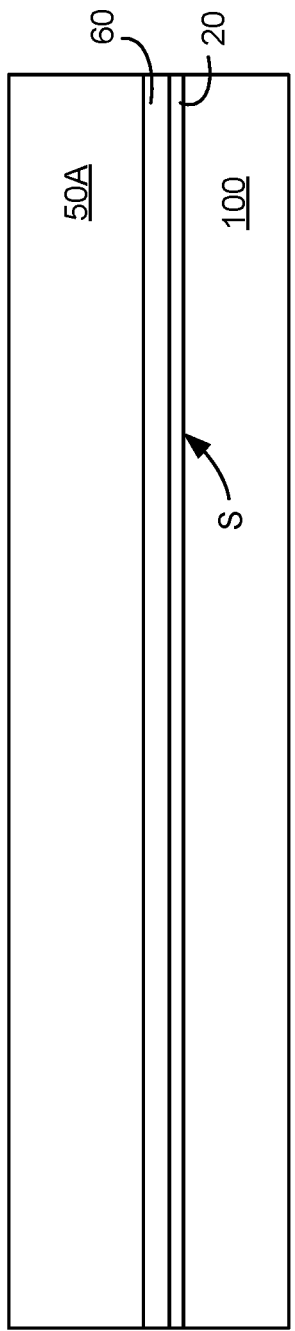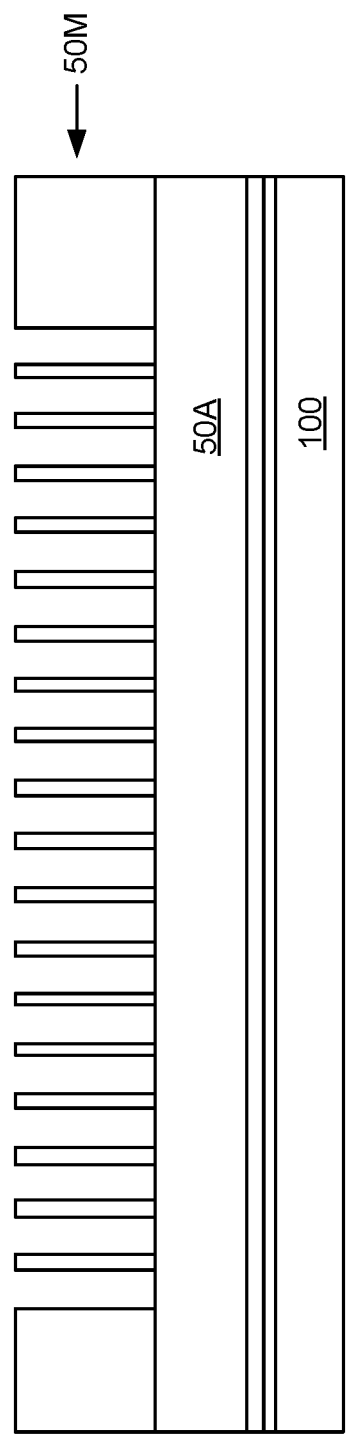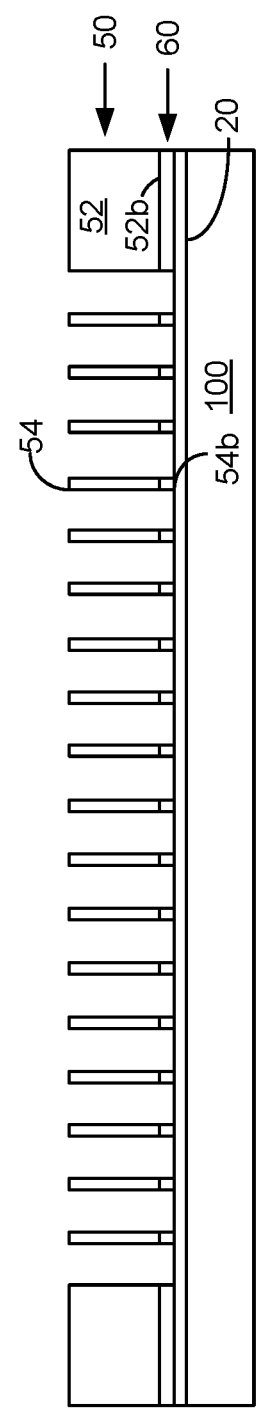

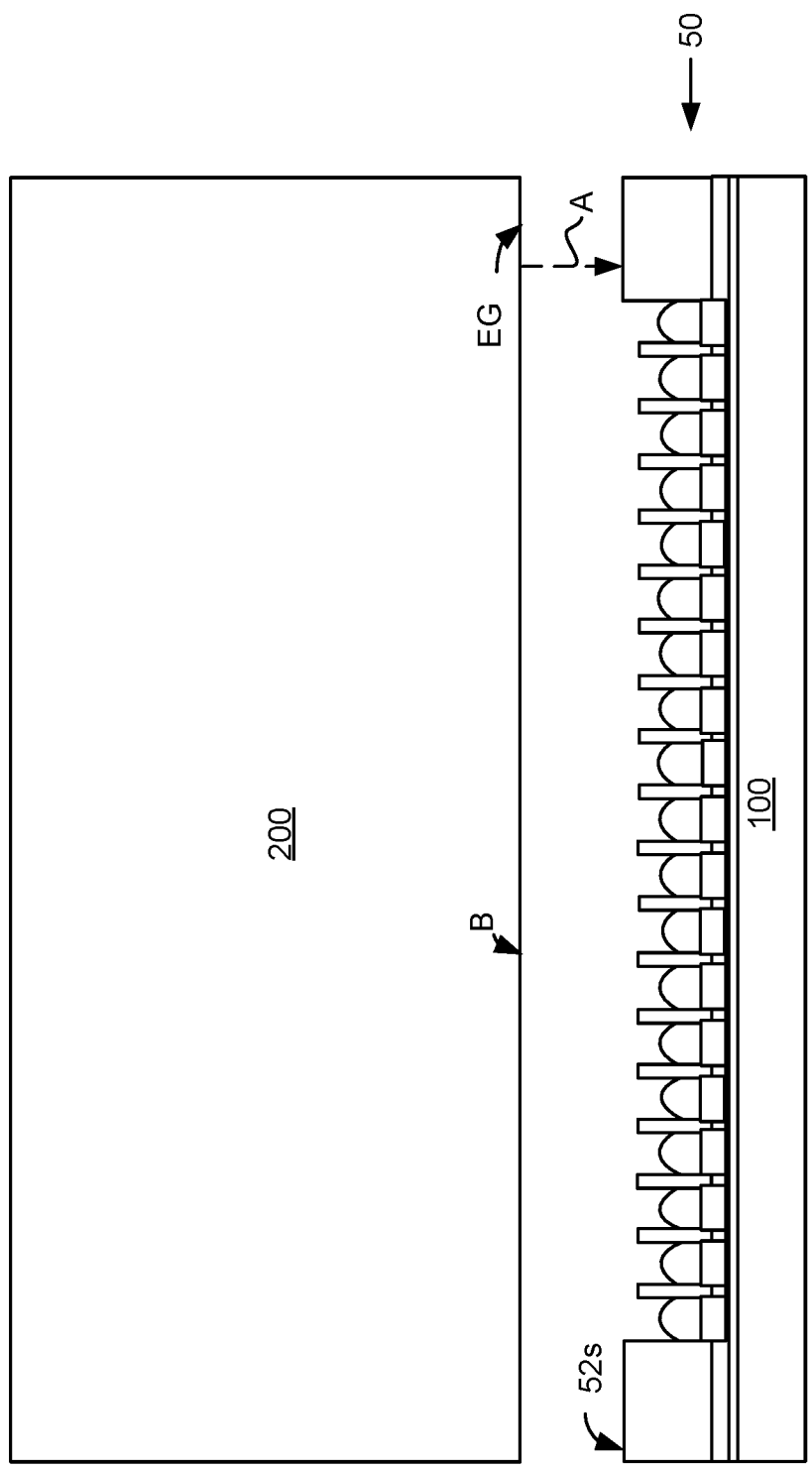

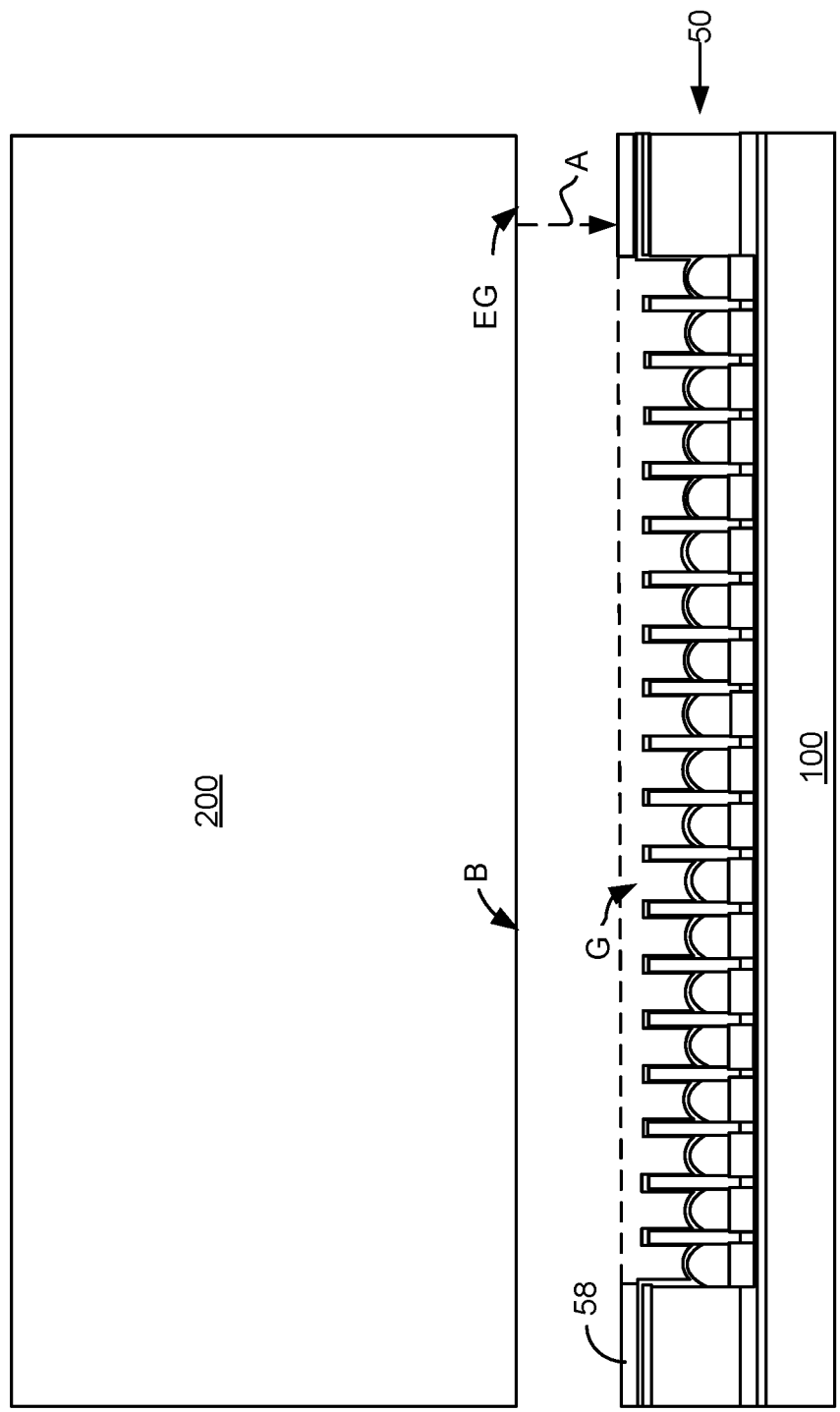

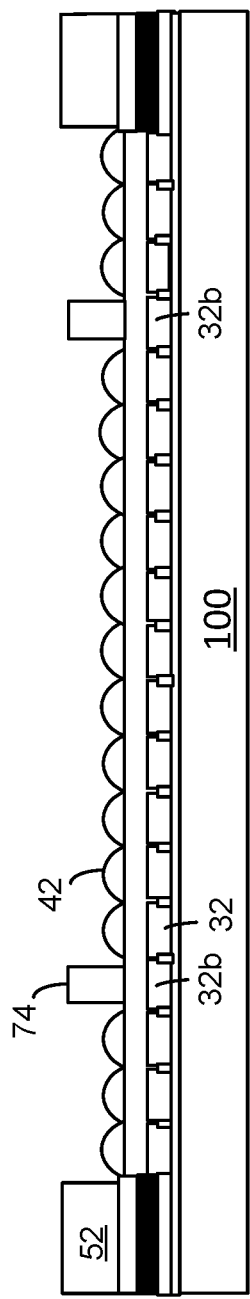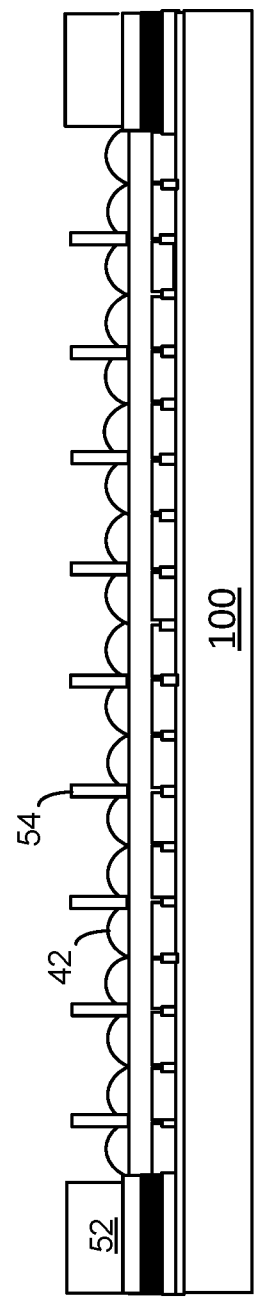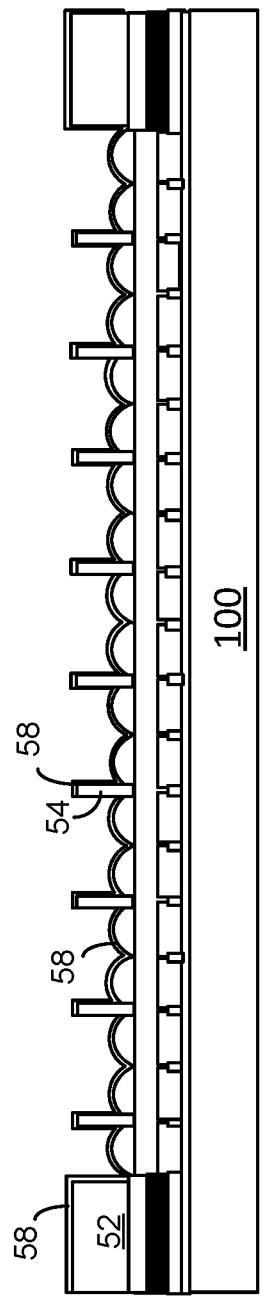

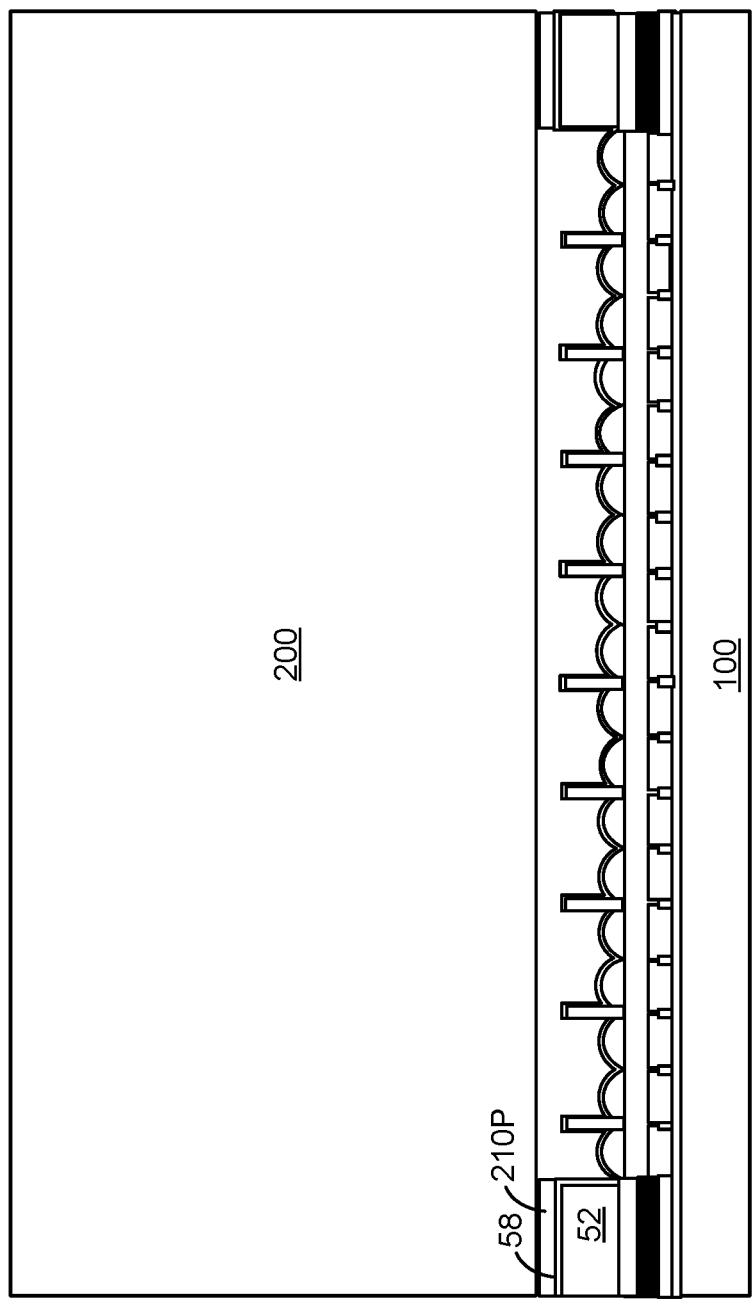

OPTICAL SENSOR TRANSPARENT COVER WITH ARRAY CONTACT GRID

TECHNICAL FIELD

This description relates to packaging of semiconductor optical sensors.

BACKGROUND

Digital optical sensors (e.g., a complementary metal-oxide-semiconductor image sensor (CIS) or a charge-coupled device (CCD)) are typically packaged in an integrated circuit (IC) package (i.e., a ceramic ball grid array package (CBGA) or a plastic ball grid array (PBGA) package along with a glass cover placed over the optical sensor die. With newer applications (e.g., automotive applications such as advanced driver assistance systems (ADAS) and autonomous driving (AD) systems) need other circuitry (e.g., image signal processor (ISP) or ASIC die) to be included in the same IC package as the CIS die for improved imaging performance. The other circuitry (e.g., image signal processor (ISP) or ASIC die) can be placed underneath the optical sensor die, which has the glass cover placed over it.

SUMMARY

In a general aspect, a package includes an optical sensor die, a support grid structure disposed on the optical sensor die, and an optically transparent cover attached to the support grid structure. A surface of the optical sensor die includes an optically active surface area (OASA) and an edge surface portion lying outside a perimeter of the OASA. The support grid structure disposed on the surface of the optical sensor die includes at least one pillar disposed within the OASA and an edge block disposed on the edge surface portion lying outside the perimeter of the OASA. The optically transparent cover is supported by the support grid structure at a height above the optical sensor die while maintaining an air gap between the optically transparent cover and the OASA.

In a general aspect, a package includes an optical sensor die having a surface including an array of photo-sensitive pixels, a layer of color filters disposed above the array of photo-sensitive pixels, and a layer of micro lenses disposed above the array of photo-sensitive pixels. Each color filter is associated with a respective photo-sensitive pixel and each micro lens is associated with a respective color filter. The package further includes a optically transparent cover having a bottom surface supported at a first height above the optical sensor die by a support grid structure. The support grid structure includes an edge block disposed on an edge of the optical sensor die. The optically transparent cover has an edge portion of its bottom surface resting on a top surface of the edge block at the first height above the optical sensor die. The package further includes at least one spacer rising from the surface of the optical sensor die to a second height toward the bottom surface of the optically transparent cover. The second height is a same as, or less than, the first height.

In a general aspect, a method includes disposing a passivation layer and a metal layer and a support material layer on a major surface of an optical sensor die. The major surface of the optical sensor die includes an array of photo-sensitive pixels. The method further includes patterning and etching the support material layer to form a support grid structure on the optical sensor die, forming a color filter array on the optical sensor die, forming a layer of micro lenses on the color filter array, and attaching a optically transparent cover to the support grid structure, the optically transparent cover being supported at height above the optical sensor die by the support grid structure.

In a general aspect, a method includes disposing a passivation layer and a metal layer on a major surface of an optical sensor die. The major surface of the optical sensor die includes an array of photo-sensitive pixels. The method further includes patterning and etching the metal layer to form a metal grid structure above the array of photo-sensitive pixels on the optical sensor die, forming a color filter array in the metal grid structure, forming a layer of micro lenses on the color filter array, forming a support grid structure on the metal grid structure on the optical sensor die, and attaching a optically transparent cover to the support grid structure. The optically transparent cover is supported at a height above the optical sensor die by the support grid structure with an air gap formed between the optically transparent cover and the optical sensor die.

The details of one or more implementations are set forth in the accompanying drawings and the description below. Other features will be apparent from the description and drawings, and from the claims.

BRIEF DESCRIPTION OF THE DRAWINGS

FIGS. 7A through 7L illustrate cross-sectional views of an optical sensor package at various stages of construction.

FIGS. 9A through 9K illustrate cross-sectional views of an optical sensor package at various stages of construction.

FIG. 10B illustrates a cross-sectional view of an optical sensor package in which a glass cover is attached to a support grid structure by an adhesive layer.

Figure 1A:
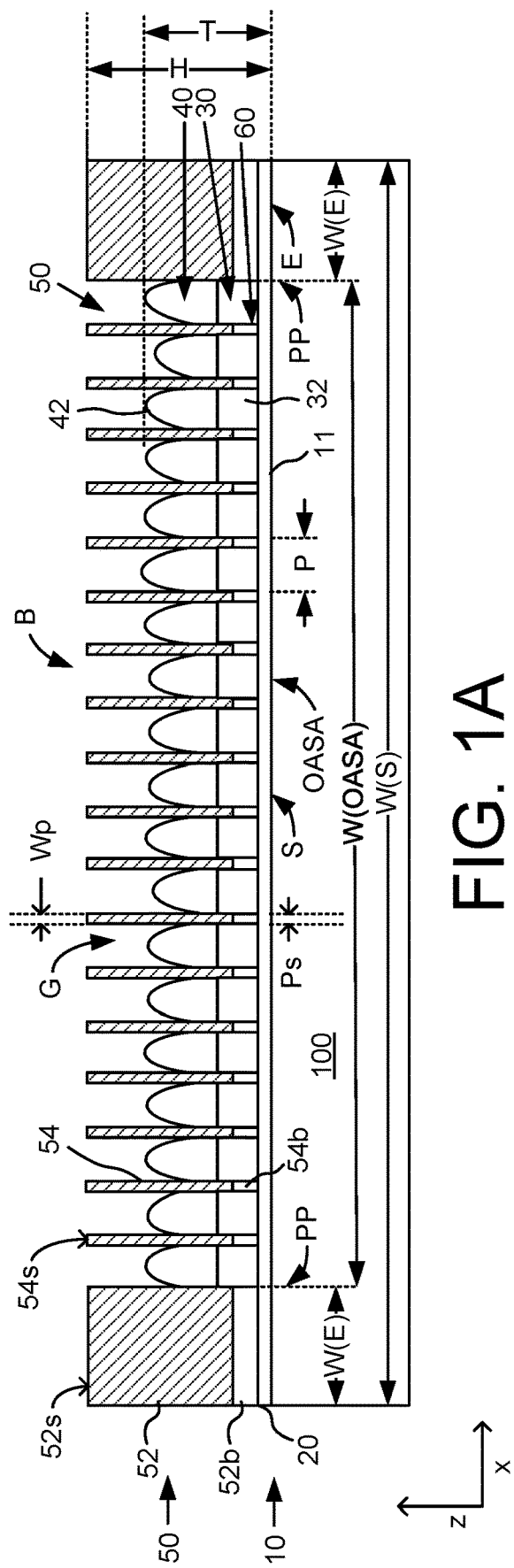
FIG. 1A illustrates, in a cross-sectional view, an example support grid structure disposed on an optical sensor die.

In the drawings, which are not necessarily drawn to scale, like reference symbols or alpha numerals may indicate like and/or similar components (elements, structures, etc.) in different views. The drawings illustrate generally, by way of example, but not by way of limitation, various implementations discussed in the present disclosure. Reference symbols shown in one drawing may not be repeated for the same, and/or similar elements in related views. Reference symbols

DETAILED DESCRIPTION

An optical sensor (e.g., a complementary metal-oxide semiconductor (CMOS) pixel sensor) fabricated on a semiconductor die includes an optically active surface area (OASA) with an array of pixel sensors (e.g., a x-y array of pixels) responsible for converting a light and color spectrum into electrical signals. Each pixel sensor in the array of pixels may, for example, include a photo diode or a photo transistor that senses and converts incident light into an electrical signal. The OSAA of an optical sensor may also include, for example, a micro lens array (e.g., a x-y array of micro lenses) to help funnel incoming light into each pixel (thereby increasing the sensitivity of the optical sensor) and or include a color filter array (CFA) (e.g., a x-y array of filters) (i.e., a mosaic of tiny color filters coupled to the pixel sensors to capture color information).

The term pixel as used herein can refer to either an individual pixel sensor (e.g., a photo diode or a photo transistor), to the individual pixel sensor and an associated color filter, or collectively to the individual pixel sensor, the associated color filter, and an associated micro lens.

This disclosure describes optical sensor packages and methods for assembling the optical sensor packages.

An optically transparent cover (also can be referred to as a glass cover) overlays the optical sensor die in many optical sensor package configurations. The cover glass may be attached to the semiconductor die, for example, by a bead of adhesive material (e.g., an epoxy or a resin) disposed on edges of the semiconductor die. The cover glass provides a hard cleanable surface as the top surface of the sensor the optical sensor die and can physically shield the delicate optical sensor surface (e.g., the optically active surface area) from physical damage (caused, e.g., by dirt, dust, fingerprints, grease, smudges, etc.). The cover glass itself can provide a hard cleanable surface as the top surface of the packaged optical sensor die.

In example implementations, the cover glass is positioned above the optical sensor surface with an air gap interposed between a bottom surface of the cover glass and the optically active surface area (OASA) (i.e., the area above the sensor pixels, and including the CFA and micro lens layers).

The presence of the air gap can mitigate or reduce image-degrading optical phenomena (e.g., halo flares) that may be caused by reflected light being scattered back on to the optically active surface area. The cover glass may have, for example, a refractive index≥1.5 and a corresponding critical angle of 42° or higher. The refractive properties of the combination of the cover glass and the air gap (e.g., refractive index=1.0) can help reduce an amount of scattered light from reaching (or re-reaching) the optically active surface area. The difference in the refractive indices of the cover glass and the air gap can cause at least some of the incident light reflected or scattered back from the optically active surface area (e.g., light reflected at angles greater than the critical angle ~42°) to be removed from the optical train by total internal reflection in the cover glass and prevented from being scattered (or reflected) back on to the optically active surface area.

Sensors of, for example, consumer cameras (e.g., with 8 to 12 megapixels) often have pixel sizes typically of 1.7 µm. The light-active surface area per pixel is therefore typically only approximately 3 µm 2 in size. With increasing miniaturization of devices (and packages) in the industry, the geometries of the optical sensors are also shrinking making it more difficult to bond the cover glass via an epoxy edge bead on the periphery or edge of an optical sensor die. Further, the other circuitry (e.g., image signal processor (ISP) or ASIC die) associated with the optical sensor is placed (i.e., stacked) underneath the optical sensor die in a package to reduce package dimensions (e.g., cross sectional dimensions). All or almost all a top surface of an optical sensor die may be occupied by the optically active surface area. This can lead to even less peripheral surface area (on the periphery or edges of the optical sensor die outside a perimeter of the OASA) available in the plane of the optical sensor die for placing an epoxy edge bead to support the cover glass above the OASA.

An apparent solution, for instances where there is insufficient peripheral surface area to put an edge bead of adhesive material to secure the cover glass, is to put the adhesive material over optical sensor array itself to form the main bonding surface to secure the cover glass. However, this solution results in no air gap between the cover glass and the optically active area of the optical sensor. Removal of the air gap between the optically active area of the optical sensor and the cover glass results in the previously noted problem with halo flare, which is caused, for example, by bright light from an object being scattered from the optical sensor surface and then reflected back from the top surface of the cover glass (when the angle of reflection exceeds the air-glass critical angle).

Support structures for securing a cover glass on an optical sensor with an air gap between the cover glass and the optical sensor are described herein.

A support structure for securing a cover glass on the optical sensor includes a support grid structure disposed on the optical sensor surface to augment the surface contact with the cover glass, in accordance with the principles of the present disclosure. The support grid structure surrounds and extends over the OASA of the optical sensor. The support grid structure may include a x-y array of spacers (e.g., stand-off posts, pillars, or (grid boundary) sidewalls) extending perpendicular the optical sensor surface. The spacers (e.g., stand-off posts, pillars, or side walls) can be interspersed with elements (e.g., optical sensor pixels, color filters, and micro lenses) of the optically active surface area on the optical sensor surface. The x-y array of spacers (e.g., stand-off posts, pillars, or (grid boundary) side walls) extending perpendicular the optical sensor surface may act (e.g., as bumpers) to prevent the glass cover from touching or contacting the OASA even when the glass cover flexes. The spacers may have a low areal density so that the support grid structure has a lower (effective) refractive index than a refractive index of the glass cover.

Top surfaces of the support grid structure can augment an amount of the surface area (edge surface portion) available at the periphery or edges of the optical sensor die (outside the perimeter of the OASA) for bonding or attaching the cover glass. In example implementations, the spacers (e.g., stand-off posts, pillars, or side walls) on the OASA interspersed with elements (e.g., optical sensor pixels) of the OASA may, for example, extend or rise to a (vertical) height H perpendicular the OASA. This vertical height H can prevent the cover glass from physically contacting (touching) the optical sensor pixels/micro lenses while retaining an air gap above the micro-lenses to obviate or reduce the halo flare issue.

In some implementations, the top surfaces of the spacers (e.g., stand-off posts, pillars, or side walls) may be physically attached to the bottom surface of the glass cover. In such implementations, the spacers can act as light pipes for stray or reflected light to be channeled into areas between pixels so that the light would be mostly absorbed and not converted to electrical signal. In some other implementations, the top surfaces of at least some of the spacers (e.g., stand-off posts, pillars, or side walls) may not be physically attached to the bottom surface of the glass cover. In such implementations, the spacers may still serve as mechanical bumpers or guards to keep the glass cover at a distance from the optical sensor pixels/micro lenses to prevent the glass cover from physically contacting (touching) the optical sensor pixels/micro lenses (e.g., when the glass cover flexes downward in response to touch). A low-refractive index gap (e.g., an air gap) between the top surfaces of the spacers (e.g., stand-off posts, pillars, or side walls) and the bottom surface of the glass cover may also diminish an amount of light that could enter the optical sensor die from the glass cover via the spacers (compared, e.g., to spacers that are physically attached to the bottom surface of the glass cover).

FIG. 1A illustrates, in a cross-sectional view, an example support grid structure 50 that can be disposed on an optical sensor die 100.

Optical sensor die 100 may, for example, include an array of pixels 10 (e.g., an array of pixels including pixel 11) disposed in a x-y plane on a top surface S of optical sensor die 100. The array of pixels 10 (e.g., pixel 11) may, for example, have a pitch P (in the x-direction). In example implementations, pitch P may be between about 1 μm and 4 μm (e.g., 2 μm).

A passivation layer (e.g., layer 20) may be disposed on array of pixels 10. The passivation layer (e.g., layer 20) may, for example, include silicon oxide and or silicon nitride, or a dielectric stack designed to limit reflection at the semiconductor surface.

Optical sensor die 100 may further include a layer of color filters (e.g., a color filter array 30) and a layer of micro lenses (e.g., layer of micro lenses 40) disposed above passivation layer 20 on the array of pixels. Each pixel 11 may be associated with a corresponding color filter (e.g., color filter 32) in color filter array 30 and a corresponding micro lens (e.g., micro lens 42) in the layer of micro lenses 40. Color filter array 30 may, for example, be Bayer (red-green-blue (RGB)) filter array, a red-green-blue-shared exponent (RGBE) filter array, a cyan-yellow-yellow-magenta (CYYM) filter array, or any other type of color filter array. Color filter 32 may be a filter with any chromacity (e.g., red, blue, or green color) in color filter array 30.

An optically active sensor area (OASA) is formed on top surface S of optical sensor die 100 by the array of pixels 10, the layer of color filters 30, and the layer of micro lenses 40 (disposed above passivation layer 20). Optical sensor die 100 may, for example, be a back side illuminated sensor (BSI) with circuitry (not shown) needed to collect light values at the OASA and transfer the light values to a processor disposed below or under the OASA.

The OASA may for example, have a width W(OASA) (in the x direction).

In example implementations, the array of pixels 10 (including, e.g., pixel 11) may not extend up to the edges of optical sensor die 100. An edge portion (e.g., edge E) of top surface S of optical sensor die 100 may be free of optically active elements (e.g., pixel 11, etc.). The edge portion (e.g., edge E) may, for example, have a width W(E) (in the x direction).

The top surface S of the optical sensor die may, for example, have a width W(S) (in the x direction) including a width of the OASA (W(OASA)) and the widths (W(E)) of edge portions (E) of the optical sensor die that are outside a perimeter (PP) of the OASA.

In example implementations, a support grid structure 50 may be disposed on the top surface of optical sensor die 100 to support the optically transparent cover (e.g., glass cover) at a height above the optical sensor die 100 while maintaining an air gap (e.g., air gap G) between the glass cover and the optically active surface area (OASA) of the optical sensor die. Although referred to as a glass cover in many of the implementations, the glass cover can be any type of optically transparent cover.

Figure 1B:
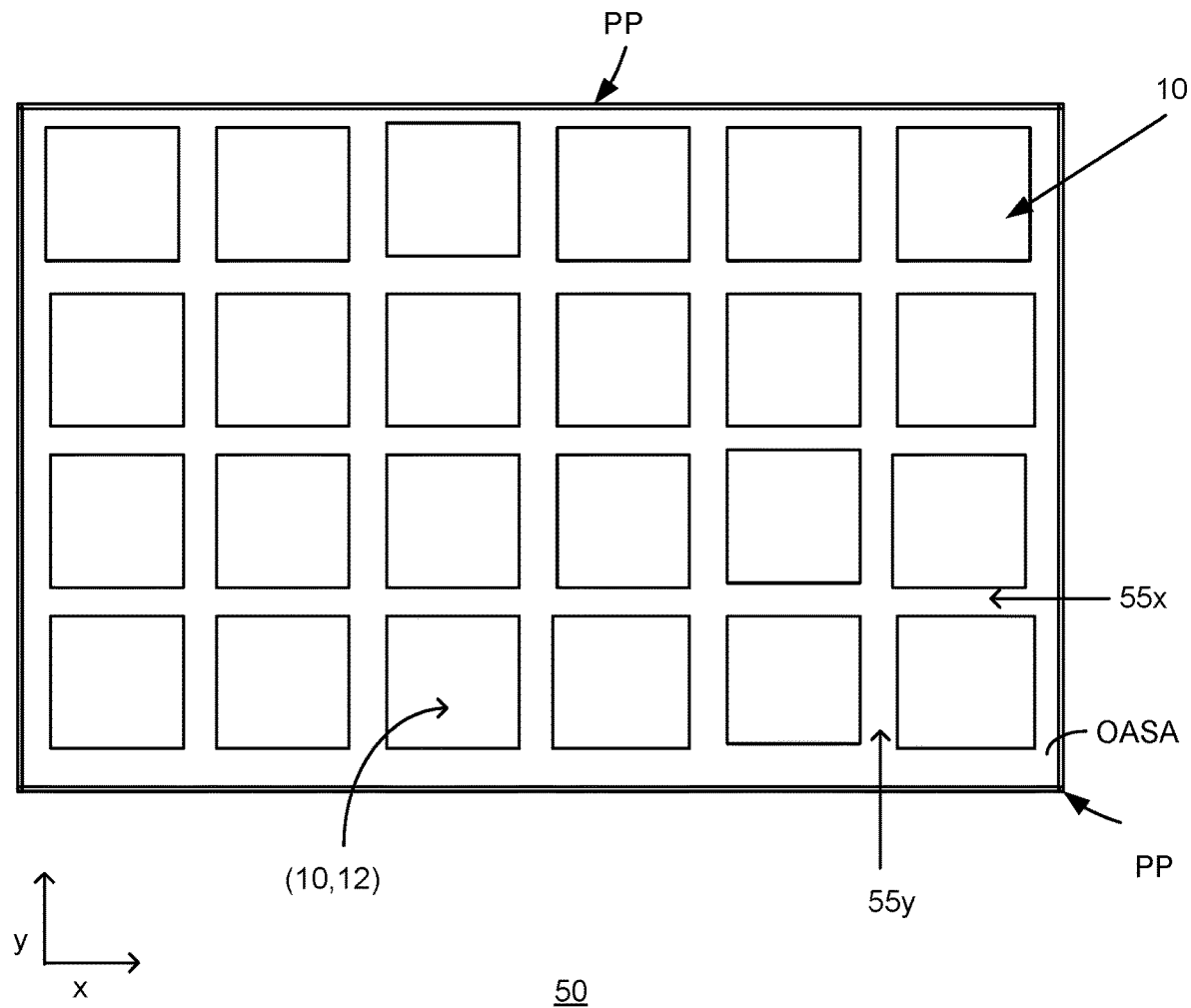
FIG. 1B illustrates a top view of an example support grid structure.

Support grid structure 50 may include an array of spacers including edge blocks (e.g., edge block 52) and pillars (e.g., pillar 54, etc.) that can support a glass cover (e.g., glass cover 200, FIG. 1C) at a height above the optical sensor die while maintaining an air gap G between the glass cover and the optically active areas of the optical sensor die. The pillars (e.g., pillar 54, etc.) may have a vertical height (e.g., height H) extending from the OASA in the z direction, and a width (e.g., width Wp) in the x direction across the OASA. The width Wp of a pillar (e.g., pillar 54, etc.) may be comparable (e.g., smaller than) an inter-pixel separation distance (e.g., Ps) of adjacent pixels (in the x direction) in the optical sensor die. In example implementations, the pillars (e.g., pillar 54, etc.) may have a depth (e.g., Wd, not shown in FIG. 1A) in the y-direction so that adjacent pillars in the y direction can jointly form a vertical wall extending in the y direction across the OASA. In such implementations, support grid structure 50 may have a form of several intersecting vertical walls extending in the x and/or y directions across the OASA. FIG. 1B shows a top view of an example support grid structure 50 that includes an array of vertical walls (e.g., wall 55X and wall 55Y extending in the x and y directions, respectively) disposed on the array of pixels 10. A cross-sectional view of wall 55Y is shown as pillar 54 in FIG. 1A. The intersecting walls (e.g., wall 55X and wall 55Y) of support grid structure 50 may define or partition the array of pixels 10 into blocks of pixels (e.g., block 12). Each block 12, may, for example, include a single pixel (e.g., pixel 11) or a multiple number of pixels.

As shown in FIG. 1A, support grid structure 50 may be disposed on top surface S of optical sensor die 100 with edge blocks (e.g., edge block 52) attached to and aligned with edge portions (e.g., edge E) that are outside the perimeter PP of the OASA (in other words, are free of optically active elements (e.g., pixel 11)). Further, spacers (e.g., pillar 54) in the support grid structure 50 may be interspersed between pixels (e.g., pixel 11) in the array of pixels 10 and attached to the OASA on top surface S of optical sensor die 100. In example implementations, a ratio of a number of spacers (e.g., pillar 54) to a number of pixels (e.g., pixel 11) (e.g., in the x direction) may be about 1 to N, where N is an integer. In the example shown in FIG. 1, the ratio of the number of spacers (e.g., pillar 54) to the number of pixels in the x direction is, for example, about 1 to 1.

In example implementations, a light shield layer 60 made of light absorbing material (e.g., tungsten (W)) may be patterned on top surface S of optical sensor die 100 above passivation layer 20 before support grid structure 50 is fabricated. An element (e.g., light shield element 52b) of light shield layer 60 may be disposed between the edge blocks (e.g., edge block 52) and passivation layer 20. Further, elements (e.g., light absorptive element 54b) of light shield layer 60 may be disposed between the pillars (e.g., pillar 54) and passivation layer 20.

In the example shown in FIG. 1A, the edge blocks (e.g., edge block 52) (outside the OASA) and the pillars (e.g., pillar 54) (within the OASA) may each have the height H (in a vertical z direction) above top surface S of sensor die 100. Height H may be greater (higher) than the combined height or thickness T of the color filter array 30, the layer of micro lenses 40, and the passivation layer 20 disposed on pixel layer 10. In example implementations, the height H of the edge blocks (e.g., edge block 52) and the pillars (e.g., pillar 54) above top surface S of sensor die 100 may be about two to three times the combined height or thickness T of the color filter array 30, the layer of micro lenses 40, and the passivation layer 20. In example implementations, for pixel layer 10 with a pixel pitch P of about 2 μm, the combined height or thickness T of the color filter array 30, the layer of micro lenses 40, and the passivation layer 20 disposed on pixel layer 10 may, for example, be about 3 μm. The height H of the edge blocks (e.g., edge block 52) and the pillars (e.g., pillar 54) above top surface S of the OASA of sensor die 100 may, for example, be between 6 μm to 9 μm (e.g., 7 μm)

The edge blocks (e.g., edge block 52) and the pillars (e.g., pillar 54) may have top surfaces (i.e., top surface 52s and top surface 54s, respectively) that can be attached to a glass cover (e.g., glass cover 200, FIG. 1C) to support the glass cover at the height H (in the z direction) above sensor die 100 while retaining an air gap (e.g., air gap G) between the cover glass and the layer of micro lenses 40 below.

In example implementations, top surfaces of the edge blocks (e.g., edge block 52) and the pillars (e.g., pillar 54) may be attached to the glass cover by an adhesive material (e.g., an epoxy) or by bonding (e.g., oxide-oxide bonding).

Figure 1C:
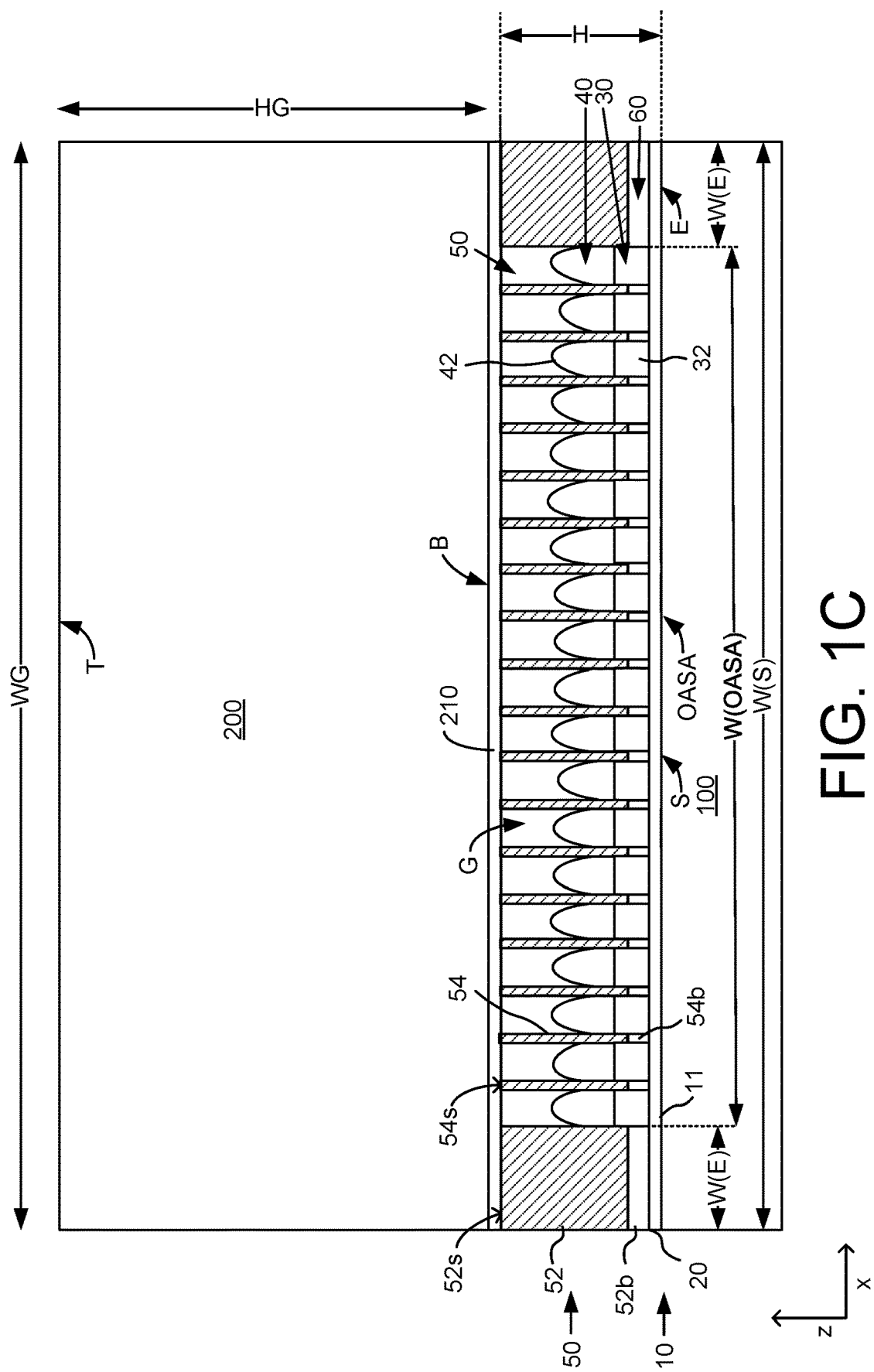
FIG. 1C illustrates a glass cover attached by an adhesive layer to the optical sensor die of FIG. 1A.
Figure 1D:
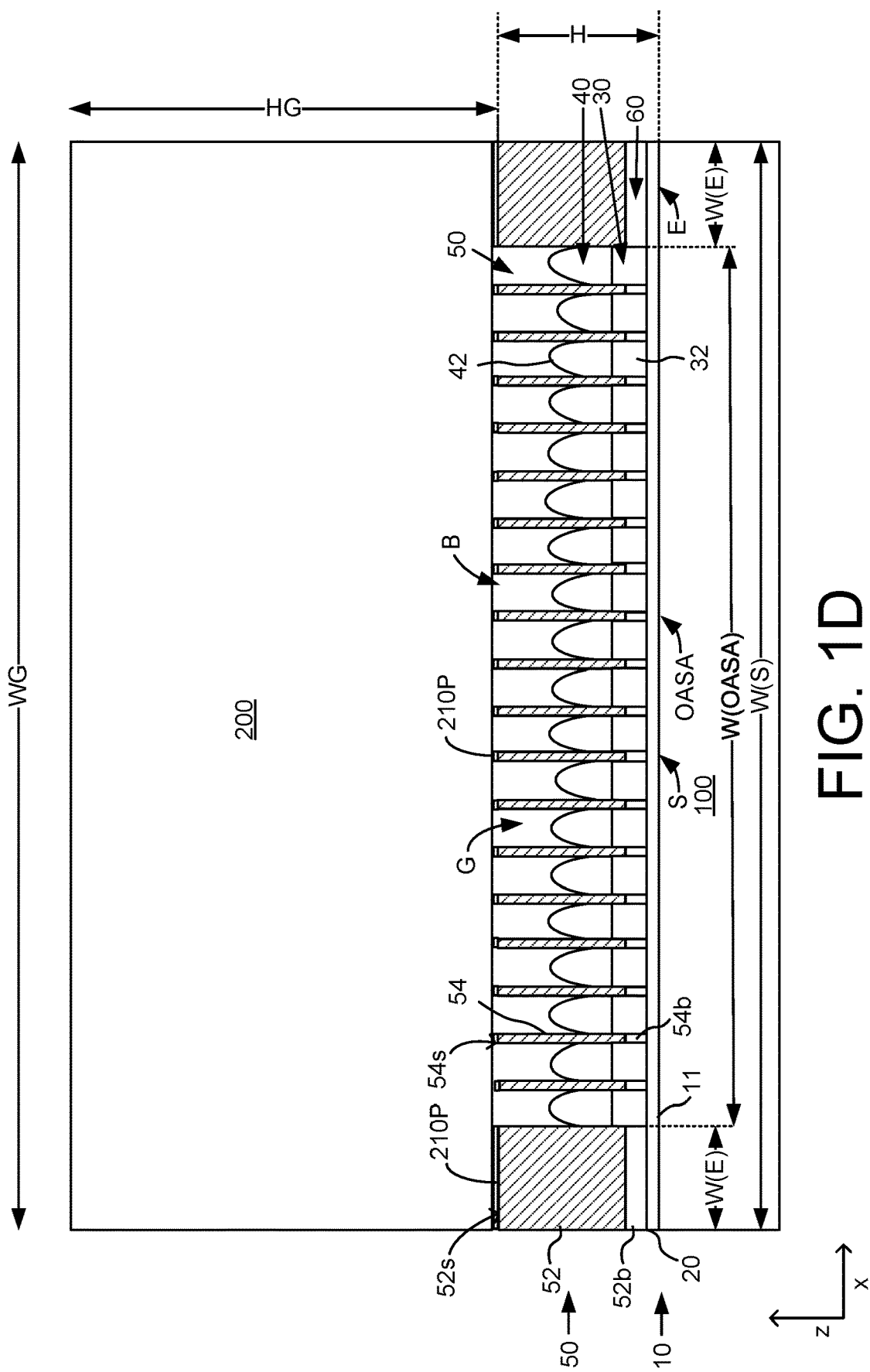
FIG. 1D illustrates a glass cover attached by a patterned adhesive layer to the optical sensor die of FIG. 1A.

FIG. 1C schematically illustrates a glass cover (e.g., glass cover 200) attached to the support grid structure 50 above optical sensor die 100 of FIG. 1A.

Glass cover 200 (made of transparent glass) may have a top surface (e.g., surface T) and a bottom surface (e.g., surface B). The glass cover may have a height or thickness HG (in the z direction) between the top surface (e.g., surface T) and the bottom surface (e.g., surface B), and a width WG (in the x direction). An adhesive layer 210 is disposed on a bottom surface (e.g., surface B) of the glass cover. Glass cover 200 is placed on support grid structure 50 (e.g., on top surface 52s and top surface 54s, respectively, of the edge blocks (e.g., edge block 52) and the pillars (e.g., pillar 54)). The bottom surface (surface B) of the glass cover is at about a height H above the OASA of optical sensor die 100 and is attached to the top surfaces (e.g., top surface 52s) of the edge blocks and the top surfaces (e.g., top surface 54s) of the pillars. This manner of disposing glass cover 200 above optical sensor die 100 retains an air gap (e.g., air gap G) between the cover glass and the layer of micro lenses 40 below.

In the example implementation shown in FIG. 1C, adhesive layer 210 is disposed over all the bottom surface (surface B) of glass cover 200. Adhesive layer 210 attaches glass cover 200 to the top surfaces (e.g., top surface 52s) of the edge blocks (e.g., edge block 52) and the top surfaces (e.g., top surface 54s) of the pillars (e.g., pillar 54) with the adhesive layer present on bottom surface B of glass cover 200 between adjacent pillars.

In some example implementations (as shown, e.g., in FIG. 1D) the adhesive layer (adhesive layer 210) disposed on the bottom surface (surface B) of glass cover 200 may be patterned so that the bottom surface (e.g., surface B) of glass cover 200 between adjacent pillars (e.g., pillar 54) is clear of the adhesive layer. The patterned adhesive layer (e.g., patterned adhesive element 210P) may be present only between surface B of glass cover 200 and the top surfaces (e.g., top surface 52s) of the edge blocks (e.g., edge block 52) and the top surfaces (e.g., top surface 54s) of the pillars (e.g., pillar 54).

In some example implementations, the top surfaces (e.g., top surface 52s) of the edge blocks (e.g., edge block 52) and the top surfaces (e.g., top surface 54s) of the pillars (e.g., pillar 54) may be formed by oxides (e.g., silicon oxide). These may be directly attached to glass cover 200 by oxide-to-oxide bonding. In other words, patterned adhesive element 210P attaching glass cover 200 to the top surfaces (e.g., top surface 52s) of the edge blocks and the top surfaces (e.g., top surface 54s) of the pillars shown in FIG. 1D may be replaced by direct oxide-to-oxide bonds.

Figure 2:
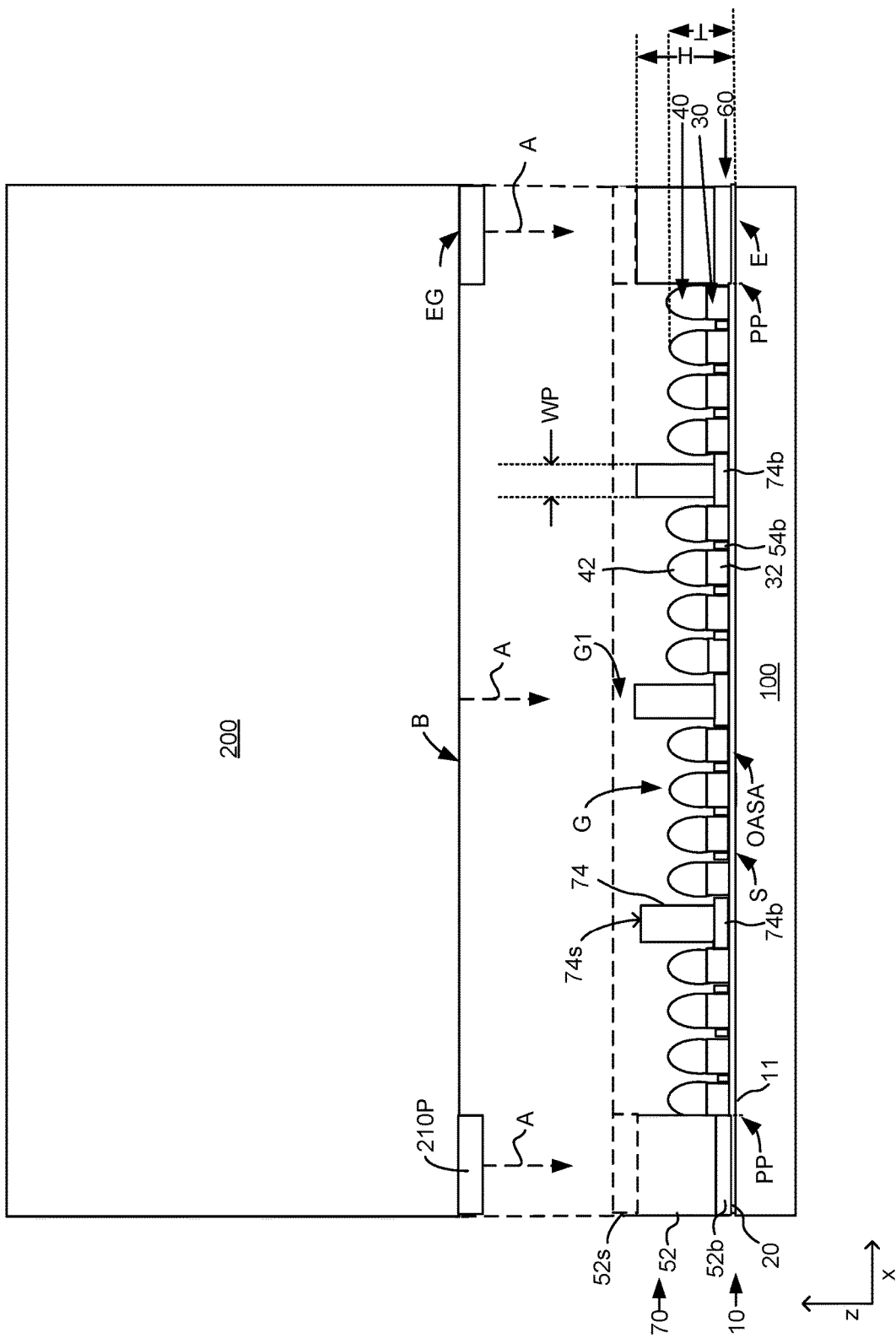
FIG. 2 illustrates a glass cover in an assembly stage of being lowered to a position on a support grid structure including pillars on the optical sensor die.

FIG. 2 illustrates, in a cross-sectional view, another example support grid structure 70 that can be disposed on an optical sensor die 100 to support a glass cover (e.g., glass cover 200) above the optical sensor die while maintaining an air gap G between the glass cover and the optically active areas of the optical sensor die. FIG. 2 schematically shows the glass cover in an assembly stage of being lowered (as indicated by downward pointing arrows A) to a position on a support grid structure (e.g., support grid structure 70) on the optical sensor die.

Support grid structure 70 may include an array of spacers (including, e.g., edge block 52, pillar or stand-off post 74, etc.) that can support a glass cover (e.g., glass cover 200) at a height H above the optical sensor die while maintaining air gap G between the glass cover and the optically active areas of the optical sensor die. Stand-off post 74 may have a width (e.g., width WP) in the x direction and a height (e.g., height H) in the z direction.

In example implementations, as shown in FIG. 2, support grid structure 70 may be disposed on optical sensor die 100 with the edge blocks (e.g., edge block 52) attached to, and aligned with, the edge portions (e.g., edge E) of the optical sensor die. The edge portions (e.g., edge E) on top surface S of optical sensor die 100 are outside the perimeter PP of the OASA and are free of optically active elements (e.g., pixel 11). Further, the stand-off posts (e.g., stand-off post 74) of support grid structure 70 may replace some of the pixels (e.g., pixels 11) in the array of pixels 10 and may be physically attached in the OASA to top surface S of optical sensor die 100. Each of the stand-off posts (e.g., stand-off post 74) may extend from an element (e.g., light shield element 74b) of light shield layer 60 in the OASA to a top surface 74S. Top surface 74S may be at a height H above the extend to a (vertical) height H perpendicular the optical sensor surface.

In example implementations, a stand-off post 74 may be positioned in an area corresponding to an (N+1) th pixel (e.g., pixel 11) in the array of pixels 10. For example, when N is equal to 4, a stand-off post 74 may be positioned on the area corresponding to every fifth pixel in the array of pixels 10 in the x direction (in other words, there may be four pixels between two adjacent stand-off post 74). In example implementations, a ratio of a number of spacers (e.g., stand-off post 74) to a number of remaining pixels (e.g., in the x direction) may be in a range of about 1 to N, where N is an integer. Integer N may, for example, be an integer in a range of 3 to 100.

Glass cover 200 may be placed on support grid structure 70 with the glass cover's bottom surface B at height H above the OASA of optical sensor die 100. FIG. 2 schematically shows glass cover 200 in an assembly stage of being lowered (as indicated by downward pointing arrows A) to a position on support grid structure 70.

In example implementations, a patterned adhesive element 210P may be disposed on surface B of glass cover 200 (e.g., as shown in FIG. 1C) so that patterned adhesive elements (e.g., adhesive element 210P) attach glass cover 200 to top surfaces 52s of edge blocks 52 and top surfaces 74s of stand-off posts 74 in support grid structure 70.

In the example implementation shown in FIG. 2, patterned adhesive element 210P may be disposed only on edges EG of the bottom surface (surface B) of glass cover 200 so that patterned adhesive element 210P attaches glass cover 200 only to top surfaces 52s of edge blocks (e.g., edge block 52) of support grid structure 70 (in other words, glass cover 200 is not attached to top surfaces 74s of stand-off posts 74). The bottom surface (e.g., surface B) of glass cover 200 between edges EG is clear of the adhesive layer (in other words, the adhesive layer is absent between edges EG). This absence of the adhesive layer may result in an air gap G1 (e.g., an additional air gap) between the bottom surface (e.g., surface B) of glass cover 200 and the top surfaces (e.g., surface 74s) of stand-off posts 74 when edges EG of the glass cover are placed on and attached to the edge blocks (e.g., edge block 52) of support grid structure 70 by patterned adhesive element 210P.

In some example implementations, the top surfaces 52s of edge blocks 52 and top surface 74s of stand-off posts 74 may be formed by oxides (e.g., silicon oxides). These may be attached to glass cover 200 by oxide-to-oxide bonding. In other words, the patterned adhesive elements (e.g., patterned adhesive elements 210P) attaching the top surfaces 52s of edge blocks 52 and top surface 54s of pillars 54 to glass cover (shown e.g., in FIG. 1D) may be replaced by oxide-to-oxide bonds which attach the bottom surface of the glass cover to the top surfaces 52s of edge blocks 52 and top surface 54s of pillars 54.

In some example implementations, light-absorbing vias or trenches may be disposed under elements (e.g., pillar 54 or stand-off post 74) of the support structure (e.g., support structure 50, FIG. 1A, support structure 70, FIG. 2) to absorb light that may pass (e.g., generally vertically in the z direction) through the pillars or the stand-off posts into the optical sensor die. The vias or trenches may be lined with light absorbing material (e.g., a metal, tungsten, etc.).

Figure 3:
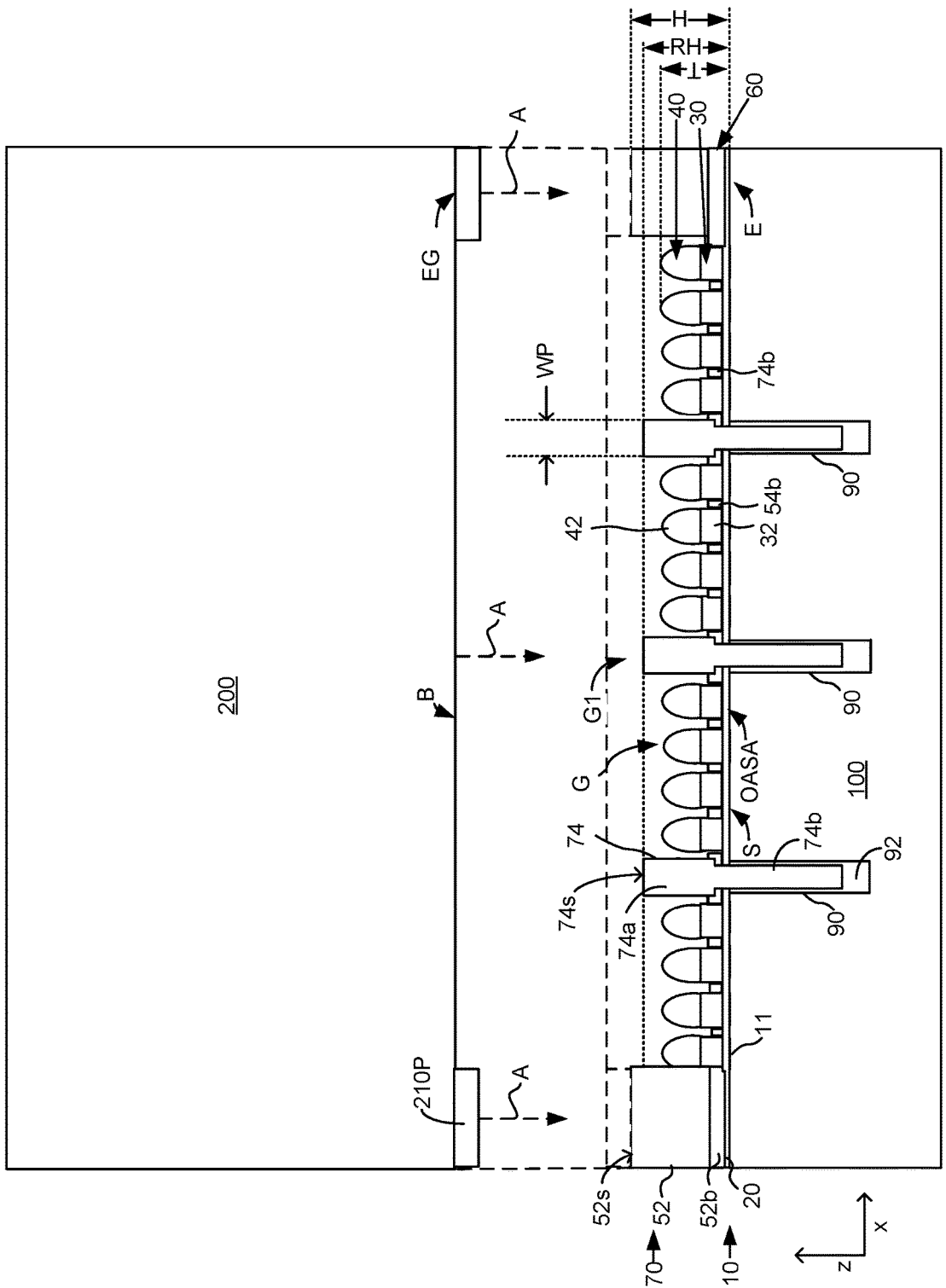
FIG. 3 illustrates a glass cover in an assembly stage of being lowered to a position on a support grid structure including stand-off posts on the optical sensor die.

FIG. 3 illustrates, in a cross-sectional view, an example arrangement 300 in which example light-absorbing vias or trenches (e.g., trench 90) are disposed in the semiconductor die (e.g., optical sensor die 100) underneath elements (e.g., stand-off post 74) of the support structures (e.g., support structure 70, FIG. 2) that are disposed on the optical sensor die to support a glass cover (e.g., glass cover 200) at a height above the optical sensor die (while maintaining an air gap G between the glass cover and the optically active areas of the optical sensor die).

In the example implementation shown in FIG. 3, optical sensor die 100 includes trenches (e.g., trench 90) extending (e.g., in the negative z direction) from the top surface S into optical sensor die 100. The trenches may be aligned with the spacers (e.g., stand-off post 74) of support grid structure 70 that support the glass cover above the OASA of optical sensor die 100. In some implementations, a stand-off post (e.g., stand-off post 74) may extend into the trench underneath so that a portion of (e.g., portion 74b) of the stand-off post is below the top surface S of optical sensor die 100 and another portion (e.g., portion 74a) is above the top surface S of optical sensor die 100. A light-absorbing material (e.g., light-absorbing material 92) (e.g., tungsten) may line the trench. Light-absorbing material 92 may, for example, fill spaces between the portion (e.g., portion 74b) of the stand-off post in the trench and sidewalls of the trench. In some example implementations, trench 90 may be a trench compatible with, or formed by, deep trench isolation (DTI) processes.

In some example implementations, the pillars (and or stand-off posts) may have a reduced height (e.g., height RH) compared to the height H of the edge block in the support grid structure (e.g., support grid structure 50, FIG. 1A, support grid structure 70) support grid structure 70, FIG. 2). As shown in FIG. 3, the height RH of the pillars or stand-off posts may, for example, be 2% to 10% less in height than the height (e.g., height H) of the edge block (in other words, RH may be in the range of 0.98 H to 0.9 H). Only the top surface (e.g., surface 52s) of the edge block may be attached to the bottom surface of the glass cover. There may be a low refractive index air gap (e.g., air gap G1) between the bottom surface (surface B) of the cover glass and the top surfaces (e.g., surface 74s) of the pillars or stand-off posts. In the example implementation shown in FIG. 3, a thickness of an air gap (e.g., air gap G1) between the bottom surface (surface B) of the cover glass and the top surfaces (e.g., surface 74s) of the pillars or stand-off posts may be determined by thickness of the adhesive layer (patterned adhesive element 210P) and a difference in the height H of the edge block and the height RH of the pillars or stand-off posts. The low refractive index air gap (air gap G1) can help reduce an amount of scattered light from reaching (or re-reaching) the optically active surface area. The pillars (and or stand-off posts) with the reduced height (e.g., height RH) can act as bumpers or guards to mechanically prevent the glass cover from touching the OASA (e.g., when the glass cover is flexed).

Figure 4:
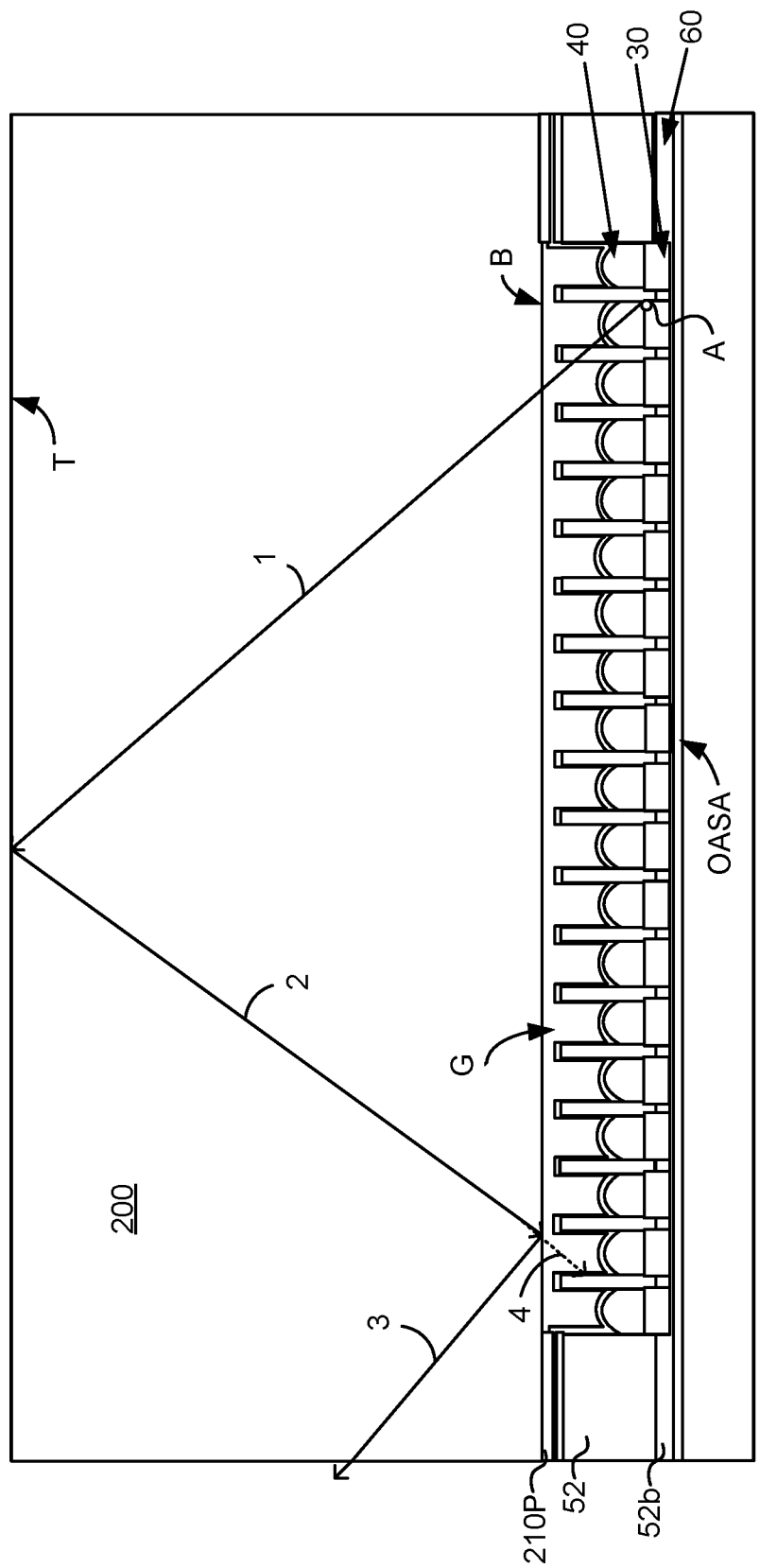
FIG. 4 schematically illustrates a utility of having a low refractive index air gap next a bottom surface of the cover glass in reducing halo flare in an optical sensor package.

FIG. 4 illustrates the utility of having a low refractive index gap (i.e., air gap G) next the bottom surface (surface B) of the cover glass in reducing halo flare that may be caused by light that is back reflected for example, from the top surface of the glass cover onto the OASA of the optical sensor die. FIG. 4 shows, for example, a ray of light (ray 1) that is scattered into glass cover 200 by a feature (e.g., focus spot A) in the OASA. Ray 1 may be reflected from the top surface (e.g., surface T) of the glass cover (e.g., as ray 2) back toward the OASA. Without the low refractive index gap (air gap G), ray 2 may be transmitted through the bottom surface (surface B) of the glass cover (e.g., as ray 4 shown in dashed line) toward the OASA to cause a halo flare (in an image being captured by the OASA). However, with the low refractive index gap (air gap G) present, at least when an angle of reflection exceeds a glass-air critical angle (~42°), ray 2 undergoes total internal reflection at the bottom surface (surface B) of the glass cover as ray 3 in a direction away from the OASA. Thus, the halo flare is avoided.

Figure 5:
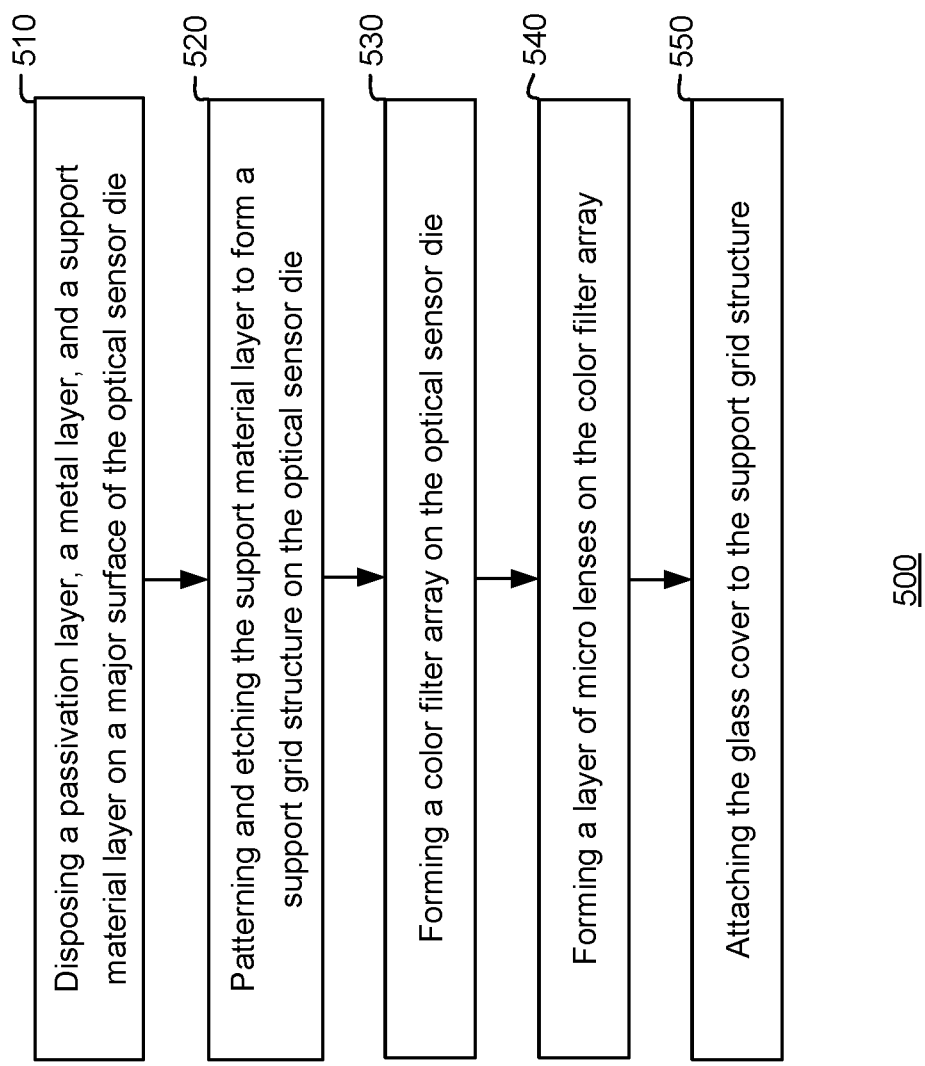
FIG. 5 illustrates an example method for fabricating an optical sensor package.
Figure 6:
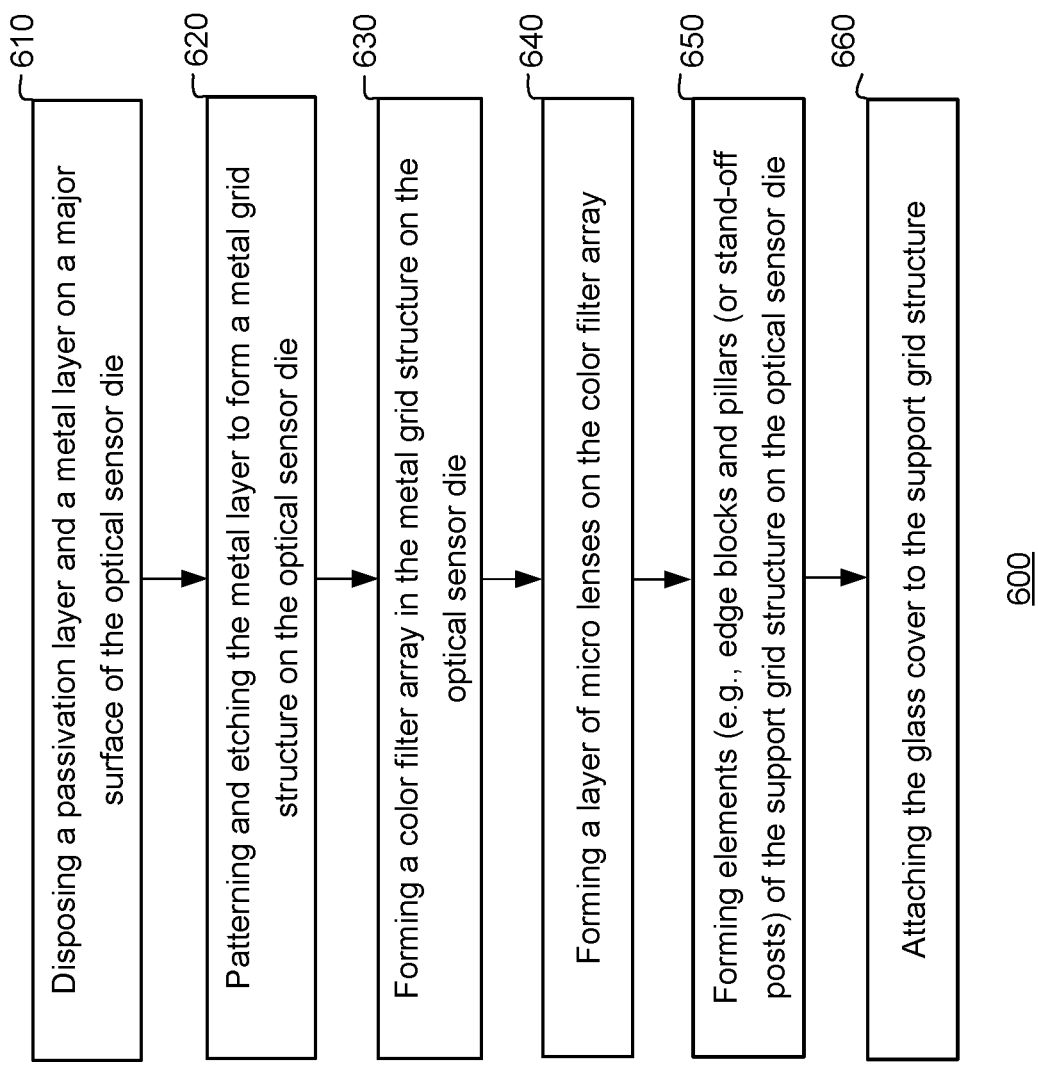
FIG. 6 illustrates another example method for fabricating an optical sensor package.

Example methods to integrate the support grid structures (e.g., support grid structure 50, support grid structure 70) with an optical sensor die while maintaining an air gap between the optical sensor die and a glass cover in an optical sensor package (e.g., optical sensor package) are described herein with reference to FIG. 5 and FIG. 6.

FIG. 5 and FIG. 6 show example method 500 and example method 600, respectively, for integrating an optical sensor die and a glass cover in an optical sensor package. The optical sensor die includes an array of photo-sensitive pixels fabricated on a major surface of the die. The optical sensor die may be a back illuminated (BSI) optical sensor die, in which case the major surface can be the back surface of the optical sensor die. The glass cover is disposed over the optical sensor die on a support grid structure that can support the glass cover at a height above the optical sensor die while maintaining an air gap between the glass cover and the optical sensor die. Method 500 involves forming the support grid structure (e.g., support grid structure 50, support grid structure 70) on the optical sensor die before forming the OASA layers (e.g., a layer of color filters, a layer of micro lenses, etc.) on the optical sensor die. Method 600 involves forming the support grid structure (e.g., support grid structure 50, support grid structure 70) on the optical sensor die after forming the OASA layers (e.g., a layer of color filters, a layer of micro lenses etc.) on the optical sensor die.

With reference to FIG. 5, method 500 includes disposing a passivation layer, a metal layer, and a support material layer on the major surface of the optical sensor die (510). The passivation layer may include dielectric material (e.g., silicon oxide, silicon nitride, etc.). The passivation layer may also include an ARC layer. The metal layer may include a light blocking metal or metal alloy (e.g., tungsten (W)). The support material layer may include inorganic materials (e.g., silicon oxide, silicon nitride, silicon oxynitride, etc.) and forms a precursor material layer for the support grid structure (e.g., support grid structure 50, support grid structure 70).

Method 500 further includes patterning and etching the support material layer to form a support grid structure on the optical sensor die (520). The patterning and etching may include disposing a photo resist mask on the optical sensor die, dry etching through the support material layer and the metal layer to form the support grid structure, and removal of the photo-resist mask. The support grid structure may include spacers (e.g., edge blocks and pillars (or stand-off posts)) disposed above (un-etched) elements of the metal layer. The spacers (e.g., edge blocks and the pillars (or stand-off posts)) may have a height (thickness) in a range of about 5 µm to 10 µm. The spacers (e.g., edge blocks and the pillars (or stand-off posts)) may be aligned with the array of pixels of the optical sensor die (with the edge blocks positioned outside the perimeter of the OASA and the pillars (or stand-off posts) positioned within the OASA).

Method 500 further includes forming a color filter array on the optical sensor die (530). Forming the color filter array may include disposing color filter resists on the optical sensor die between elements of the metal layer remaining on the optical sensor die. Each color filter in the color filter array may correspond to, and be disposed above, a respective pixel of the optical sensor die. The color filter array may have a RGB, a RGBE, a CYYM, or any other type of color pattern.

Method 500 further includes forming a layer of micro lenses on the color filter array (540). The layer of micro lenses may be made of organic material (e.g., transparent, or colorless resists). The layer of micro lenses may include gapless micro lenses or pincushion micro lenses disposed above the color filter array. The color filter array and the layer of micro lenses may have a combined thickness that is about one fifth to about one half the height of the edge blocks and the pillars (or stand-off posts) in the support grid structure.

In some example implementations, forming a layer of micro lenses on the color filter array may include etching a micro lens material disposed on the optical sensor die. Etching the micro lens material may include simultaneously etching back (or recessing) the pillars (and or stand-off posts) to a reduced height (e.g., a 2% to 10% reduction in height).

In some example implementations, method 500 may further include patterning and depositing a light blocking layer (e.g., a black light blocking resist or paint) on top surfaces of the edge blocks.

In some example implementations, method 500 may further include disposing an anti-reflective coating (ARC) layer on the support grid structure (e.g., on top surfaces of the edge blocks and pillars (or stand-off posts)) and on the top surfaces of the micro lenses. The ARC layer may be about 100 nm thick.

Method 500 further includes attaching the glass cover to the support grid structure (550). Attaching the glass cover to the support grid structure may include aligning the glass cover so that edge portions of the glass cover rest on the edge blocks of the support grid structure. The glass cover can be supported at height above the optical sensor die by the support grid structure while maintaining an air gap between the glass cover and the optical sensor die.

In some example implementations, attaching the glass cover to the support grid structure may further include direct bonding (e.g., silicon-oxide-oxide-silicon, or oxide-oxide bonding) of the bottom surface of the glass cover and top surfaces of the support grid structure (e.g., top surfaces of the edge blocks and pillars (or stand-off posts)) that are in contact with the glass cover. In instances where the pillars (or stand-off posts) are recessed or reduced in height (e.g., during micro lens etching), the top surfaces of the pillars may not contact the bottom surface of the glass cover. In such instances, attaching the glass cover to the support grid structure may include direct bonding only of the bottom surface of the glass cover and the top surfaces of the edge blocks that are in contact.

In some example implementations, attaching the glass cover to the support grid structure may further include disposing an adhesive bond layer between the bottom surface of the glass cover and top surfaces of the support grid structure (e.g., top surfaces of the edge blocks and pillars (or stand-off posts)) that are in contact with the glass cover. In instances where the pillars (or stand-off posts) are recessed (e.g., during micro lens etching) and not in contact with the glass cover, attaching the glass cover to the support grid structure may include disposing an adhesive bond layer only between the bottom surface of the glass cover and the top surfaces of the edge blocks that are in contact with the bottom surface of the glass cover.

With reference to FIG. 6, method 600 includes disposing a passivation layer and a metal layer on a major surface of the optical sensor die (610). The passivation layer may include dielectric material (e.g., silicon oxide, silicon nitride, silicon oxynitride, etc.). The passivation layer may also, for example, include ARC material.

Method 600 further includes patterning and etching the metal layer to form a metal grid structure on the optical sensor die (620). The lithographic patterning and etching may include disposing a photo-resist mask on the optical sensor die, dry etching through the metal layer to form the metal grid structure, and removal of the photo-resist mask. The metal grid structure includes elements (e.g., element 52*b* and element 54*b*) of a light shield layer that will support or underlie spacers (e.g., pillars, stand-off posts, or edge blocks) of the support grid structure at further stages of construction.

Method 600 further includes forming a color filter array in the metal grid structure on the optical sensor die (630).

Forming the color filter array may include disposing color filter resists and dye on the optical sensor die between elements of the container or metal grid structure remaining on the optical sensor die. Each color filter in the color filter array may correspond to, and be above, a respective pixel of the optical sensor die. The color filter array may have a RGB, a RGBE, a CYYM, or any other type of color pattern.

In some example implementations, forming the color filter array may include disposing a light-bocking coating on edge portions of the metal grid structure/optical sensor die.

Method 600 further includes forming a layer of micro lenses on the color filter array (640). The layer of micro lenses may be made of organic material (e.g., transparent, or colorless resists). The layer of micro lenses may include gapless micro lenses or pincushion micro lenses disposed above the color filter array. In some implementations, each color filter in the color filter array may be associated with a corresponding micro lens in the layer of micro lenses. In some other implementations, some color filters in the color filter array may not have a corresponding micro lens in the color filter array (in other words, corresponding micro lenses may be omitted for some color filters).

Method 600 further includes forming elements (e.g., edge blocks and pillars (or stand-off posts)) of the support grid structure on the optical sensor die (650). Forming elements of the support grid structure may include disposing a support material layer (e.g., support material layer 50A) on the optical sensor die, disposing a photo resist mask on the optical sensor die, dry etching through the support material layer, and removing the photo-resist mask. The elements of support grid structure (i.e., spacers such as edge blocks and pillars (or stand-off posts)) may be disposed above elements of metal grid structure. The edge blocks and the pillars (or stand-off posts) each may have a height (thickness) above the major surface of the optical sensor die in a range of about 5 µm to 10 µm. The edge blocks and the pillars (or stand-off posts) may be aligned with the array of pixels of the optical sensor die. In example implementations, a number of the pillars (or stand-off posts) formed may be the same as, or less than, the number of pixels in the array of pixels. In some example implementations, a pillar (or stand-off post) may be aligned with (e.g., disposed above) a color filter in the color filter array that does not have a micro lens associated with it. In other implementations, the pillar (or stand-off post) may be patterned in some or all of the corner gaps of the pixels, that is, at locations between or at the intersections of four micro lenses (in the two-dimensional array of micro lenses).

In some example implementations, method 600 (as in method 500) may further include patterning and depositing a light blocking layer (e.g., a black light blocking resist or paint) on top surfaces of the edge blocks and/or disposing an anti-reflective coating (ARC) layer on the support grid structure (e.g., on top surfaces of the edge blocks and pillars (or stand-off posts) and on the top surfaces of the micro lenses).

Method 600 (as in method 500) further includes attaching the glass cover to the support grid structure (660). Attaching the glass cover to the support grid structure may include aligning the glass cover so that edge portions of the glass cover rest on the edge blocks of the support grid structure. The glass cover can be supported at height above the optical sensor die by the support grid structure. Further, in method 600, as in method 500, attaching the glass cover to the support grid structure may further using direct bonding (e.g., Si—O—O—Si bonding) or an adhesive layer to couple the bottom surface of the glass cover and the top surfaces of the support grid structure (e.g., the top surfaces of the edge blocks and the top surfaces of the pillars (or stand-off posts)) that are in contact with the bottom surface of the glass cover.

FIGS. 7A through 7L schematically illustrate an optical sensor package at different stages of construction or after the different steps of method 500 for fabricating optical sensor package. FIGS. 7A through 7L show cross-sectional views of the optical sensor package at the different stages of construction.

FIG. 7A shows an example optical sensor die (e.g., optical sensor die 100) with a major surface (e.g., surface S). An array of pixels (not shown) may be disposed at, or underneath surface S of the optical sensor die.

At an initial stage of construction, a passivation layer 20 (e.g., an anti-reflective coating (ARC) layer), a light shield layer 60, and a support material layer 50A are disposed on surface S. Passivation layer 20 may, for example, be made of silicon oxide or other dielectric materials. Light shield layer 60 may, for example, be made, for example, of light absorbing material (e.g., a metal such as tungsten). The support material layer 50A provides the precursor material for forming the support grid structures (e.g., support grid structure 50, support grid structure 70) on the optical sensor die at later stages of construction.

FIG. 7B shows a photo resist mask 50M placed on the support material layer 50A at the second stage of construction. At a third stage of construction, the support material layer 50A and light shield layer 60 are dry etched through the photo resist mask to form a support grid structure (e.g., support grid structure 50) on the optical sensor die. FIG. 7C shows support grid structure 50 formed on the optical sensor die after removal of the photo resist mask 50M. Support grid structure 50 may include edge blocks (e.g., edge block 52) and pillars (e.g., pillar 54). Edge block 52 and pillar 54 may rest on elements (e.g., element 52b and element 54b, respectively) of light shield layer 60 that remain after the dry etch process.

Figure 7D:
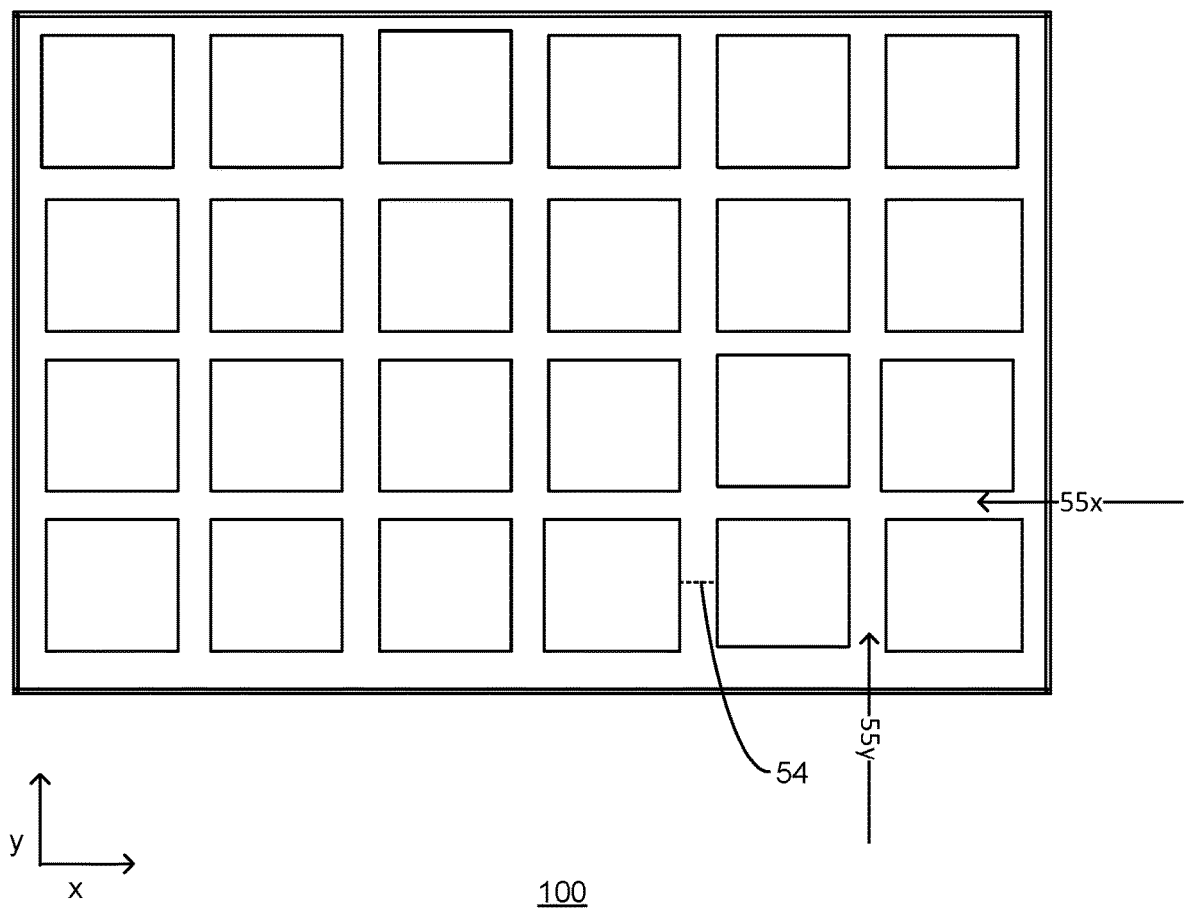

FIG. 7D shows a top view of a portion of optical sensor die after support grid structure 50 is formed on surface S of the optical sensor die. Pillars (e.g., pillar 54) of the support grid structure may form a container or a grid structure with vertical walls (e.g., wall 55x and wall 55y) extending in the x and y direction respectively.

Figure 7E:
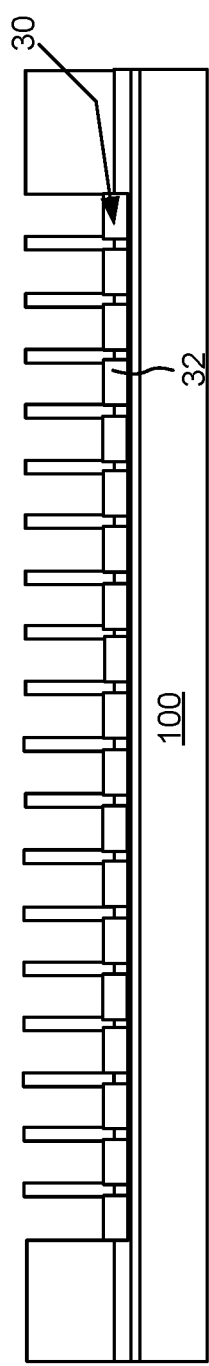

FIG. 7E shows, at a next stage of construction, a photo pattern of color filter resists (e.g., color filter array 30)) is disposed on optical sensor die 100. A color filter element (e.g., color filter 32) in the color filter array may be associated with an underlying pixel (not shown).

Next, a layer of micro lenses (e.g., layer of micro lenses 40) is formed above the color filter array 30).

Figure 7F:
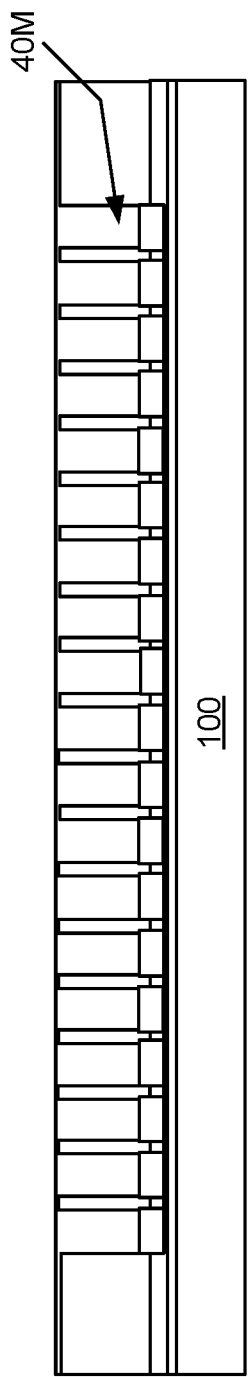
Figure 7G:
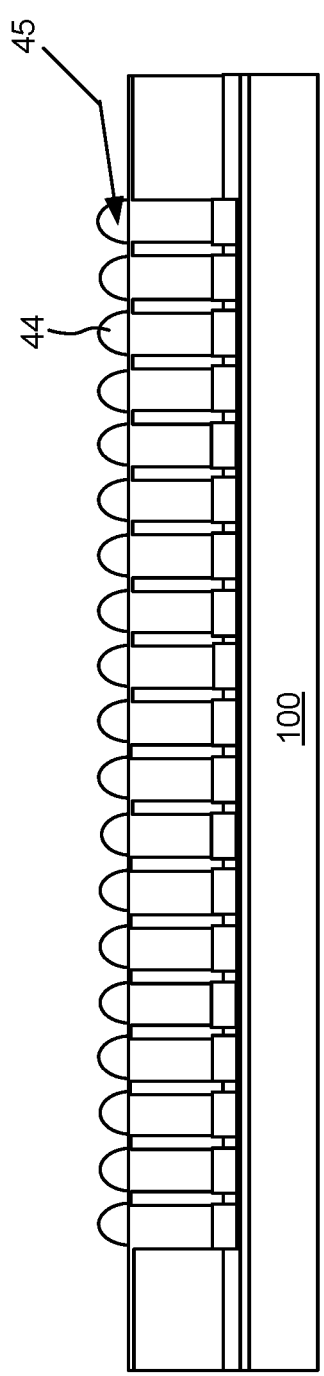

FIG. 7F shows, at a next stage of construction, the optical sensor die is covered with a layer of micro lens fill material 40M, and FIG. 7G shows, at a further stage of construction, a layer of proto-micro lenses 45 (including proto micro lens 44) is formed above micro lens fill material 40M.

Figure 7H:
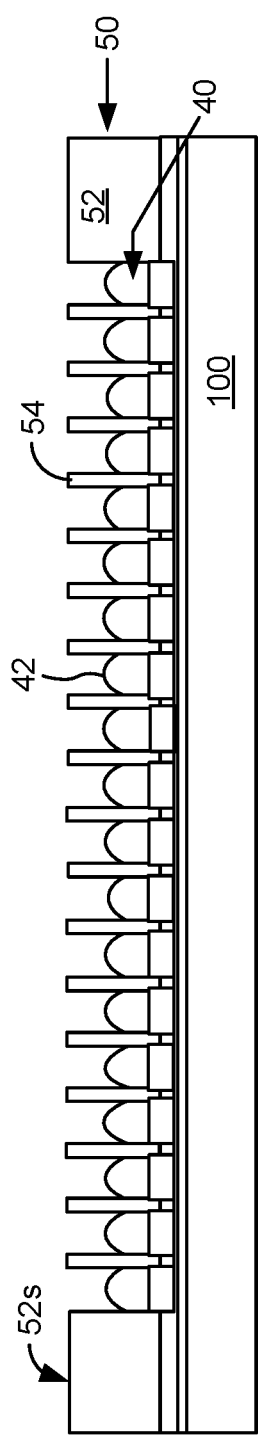

FIG. 7H shows, at the next stage of construction, in a micro lens etch transfer process (e.g., using an oxygen plasma etch highly selective to etching organic micro lens material) the layer of micro lens fill material 40M and the layer of proto-micro lenses 45 are processed to form the layer of micro lenses 40 (including micro lens 42) above color filter array 30. The micro lens etch transfer process for etching the organic micro lens material may also etch back (i.e., reduce in height) the pillars (e.g., pillar 54) of the support grid structure.

Optical sensor die 100 with support grid structure 50 (including pillar 54 and edge block 52) as shown in FIG. 7H can be fitted with a glass cover (e.g., glass cover 200) (e.g., by attaching edge block 52 to the glass cover).

Figure 7I:
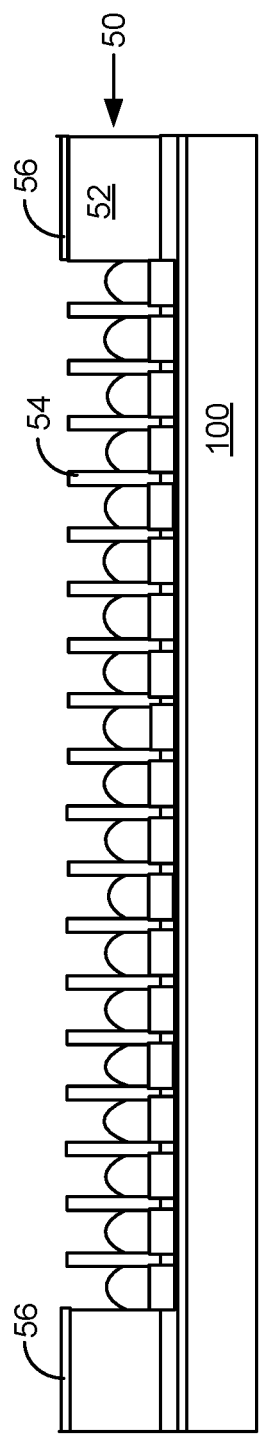
Figure 7J:
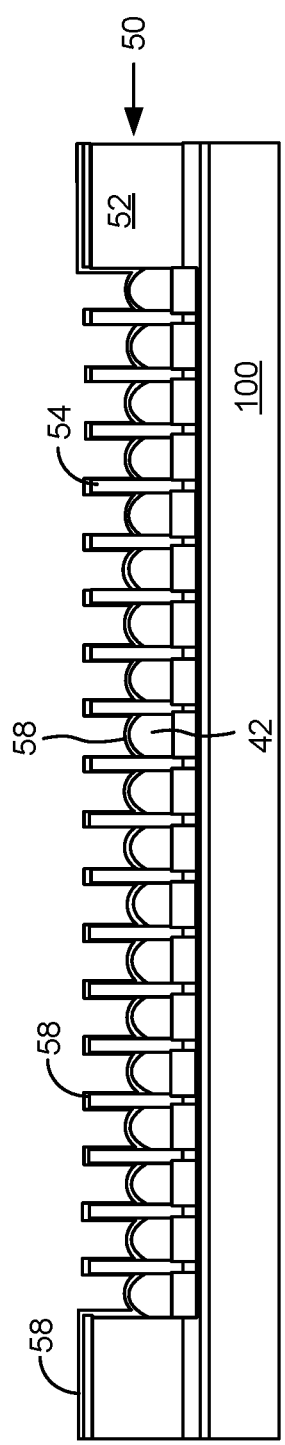

In some example implementations before the glass cover is attached to edge block 52, a light blocking material (e.g., a black paint) may be applied to top surfaces of edge block 52, and/or an ARC coating may be applied to top surfaces of the optical sensor die. FIG. 7I, shows, for example, a light blocking coating (e.g., black coating 56) applied to top surfaces of edge blocks (edge block 52) in the support grid structure 50 disposed on optical sensor die 100. FIG. 7J, shows, for example, a further ARC coating (e.g., ARC 58) applied to top surfaces of the optical sensor die including the top surfaces of edge block 52, pillars 54 and micro lens 42. In example implementations, the ARC coating (e.g., ARC 58) may be about 50 nm to 200 nm (e.g., 100 nm) thick. FIG. 7K schematically shows placement of a glass cover (e.g., glass cover 200) on the optical sensor die 100 shown in FIG. 7H. As shown in FIG. 7K, glass cover 200 may be positioned so that edge portions (e.g., edge portion EG) of the bottom surface (surface B) of the glass cover are aligned with the top surfaces (e.g., surface 52*s*) of the edge blocks (e.g., edge block 52) of support grid structure 50. The glass cover may be attached to support grid structure 50, for example, by oxide-oxide bonding between the top surfaces (e.g., surface 52*s*) of the edge blocks (e.g., edge block 52) and the bottom surface (surface B) of the glass cover.

In some example implementations, the glass cover may be attached to support grid structure 50, for example, by an adhesive layer between the top surfaces (e.g., surface 52*s*) of the edge blocks (e.g., edge block 52) and the bottom surface (surface B) of the glass cover. FIG. 7L schematically shows placement of a glass cover (e.g., on glass cover 200) on the optical sensor die 100 shown in FIG. 7J. As shown in FIG. 7L, glass cover 200 may be positioned so that edge portions (e.g., edge portion EG) of the bottom surface (surface B) of the glass cover are aligned with the top surfaces (e.g., surface 52*s*) of the edge blocks (e.g., edge block 52) of support grid structure 50. A patterned adhesive layer (e.g., patterned adhesive element 210P) is disposed on the top surfaces of the edge blocks (e.g., edge block 52) to facilitate attachment of the glass cover to support grid structure 50. The adhesive (e.g., patterned adhesive element 210P) may be photo-patterned onto the optical sensor wafer (prior to glass attach) to allow better alignment of the glass cover and the support grid structure than may be possible with standard wafer-level-packaging processes.

In example implementations, a thickness of an air gap (e.g., air gap G1) above the support structure 50 after the glass cover is attached may be determined by a thickness of the adhesive layer (patterned adhesive element 210P), the thickness of any black coating or ARC materials (e.g., black coating 56, ARC 58) used, and any etch back of the height of pillars (e.g., pillar 54) during the micro lens etch processes for forming the micro lens layer.

Figure 8:
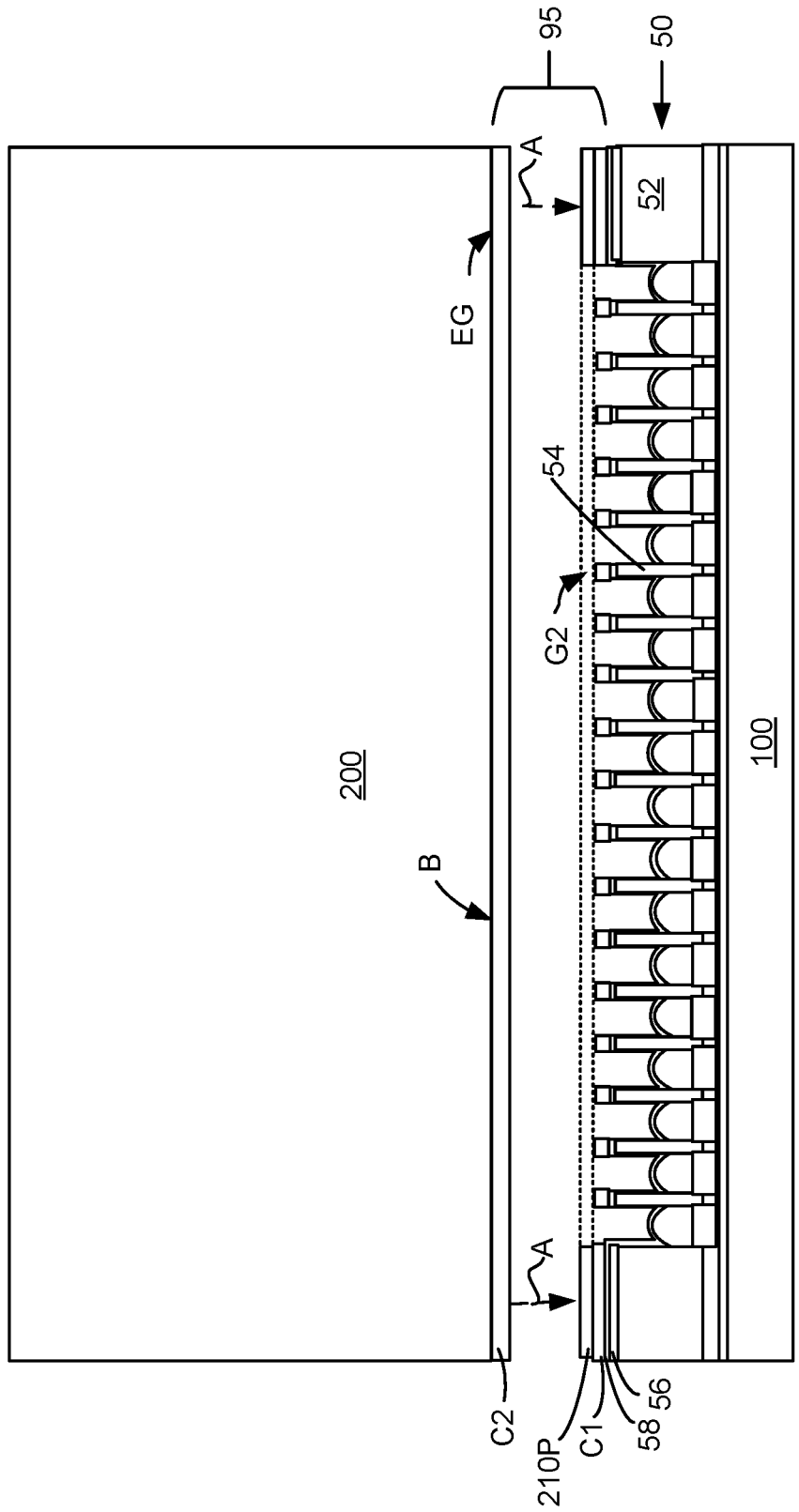
FIG. 8 illustrates an optical sensor package including a touch-pressure sensor.

In some example implementations, a touch-pressure sensor (e.g., a capacitive touch-pressure sensor) may be incorporated in optical sensor packages that include optical sensor die 100, support grid structure 50 and glass cover 200. As shown in FIG. 8, a touch-pressure sensor (e.g., touch-pressure sensor 95) may be incorporated in the assembly of optical sensor die 100, support grid structure 50 and glass cover 200 in an optical sensor package. Touch-pressure sensor 95 may include a first conductive electrode (e.g., conductive layer C1) and a second conductive electrode (e.g., conductive layer C2). Conductive layer C1 may be disposed on the bottom surface (e.g., surface B) of glass cover 200. Conductive layer C1 may include transparent conductive material, such as indium-tin-oxide (ITO). Conductive layer C2 may be disposed on top surfaces of support grid structure 50 (e.g., surface 52*s* of edge block 52 and/or surface 54*s* of pillar 54). Conductive layer C1 and conductive layer C2 may, for example, be disposed on opposite sides of patterned adhesive element 210P on surface 52*s* of edge block 52 and on opposite sides of a sensor cavity (e.g., air gap G2) formed between the bottom surface (e.g., surface B) of the cover glass and the top surfaces of support grid structure 50.

In example implementations, the first and second electrodes (conductive layer C1 and conductive layer C2) of touch pressure sensor 95 may be coupled to circuitry (not shown) configured to measure pressure applied (e.g., by touch) to the glass cover or by other pressure differential between ambient and inside the sensor cavity (e.g., air gap G2).

In example applications, touch pressure sensor 95 and the coupled circuitry may be configured, for example, to photograph a finger that touches the cover glass (for fingerprint recognition), to trigger video data collection, or periodic photo taking by the optical sensor die.

FIGS. 9A through 9K schematically illustrate an optical sensor package at different stages of construction or after the different steps of method 600 for fabricating optical sensor package. FIGS. 9A through 9K show cross-sectional views of the optical sensor package at the different stages of construction.

Figure 9A:
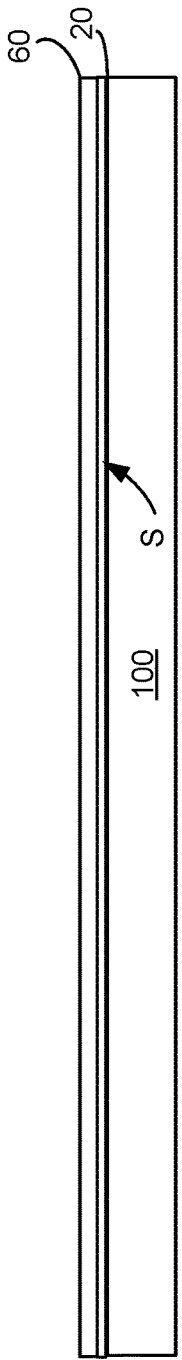

FIG. 9A shows an example optical sensor die (e.g., optical sensor die 100) with a major surface (e.g., surface S). An array of pixels (not shown) may be disposed at, or underneath surface S of the optical sensor die.

Figure 9B:
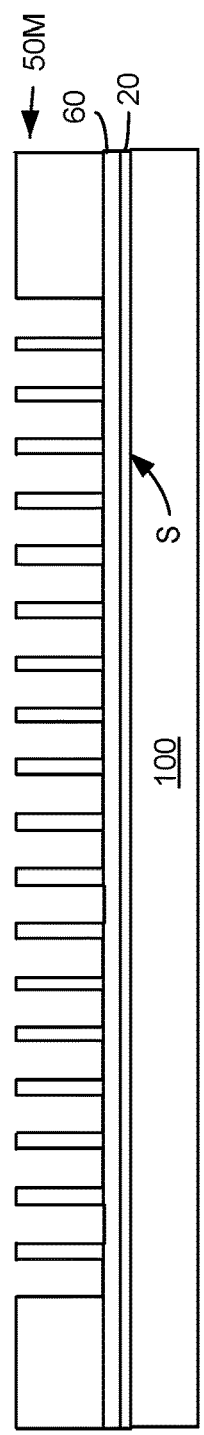
Figure 9C:
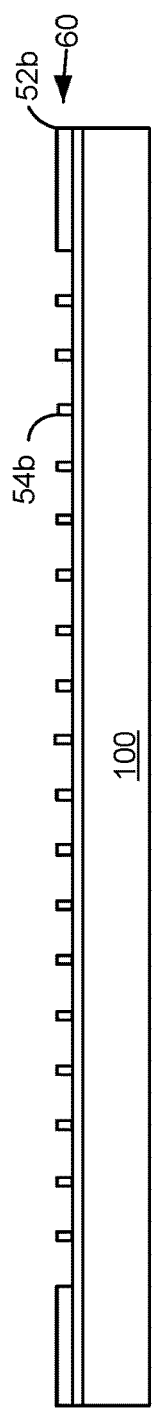

At an initial stage of construction, a passivation layer 20 (e.g., an anti-reflective coating (ARC) layer), and a light shield layer 60 are disposed on surface S. Passivation layer 20 may, for example, be made of silicon oxide or other dielectric materials. Light shield layer 60 may, for example, be made, for example, of light absorbing material (e.g., a metal such as tungsten). FIG. 9B shows a photo resist mask 50M placed on the light shield layer 60 at a second stage of construction. At a third stage of construction, the light shield layer 60 is dry etched through the photo resist mask to form a container or a metal grid structure. The container or metal grid structure includes elements of the light shield layer (e.g., element 52*b* and element 54*b*) that will support or underlie spacers (e.g., pillars, stand-off posts, or edge blocks) in the support grid structure at further stages of construction. FIG. 9C shows the light shield layer elements (e.g., element 52*b* and element 54*b*) formed on the optical sensor die after removal of photo resist mask 50M.

Elements of support grid structure 50 (e.g., edge block 52, pillar 54, or stand-off post 74) may be formed on the light shield layer elements (e.g., element 52*b* and element 54*b*) at later stages of construction.

Figure 9D:
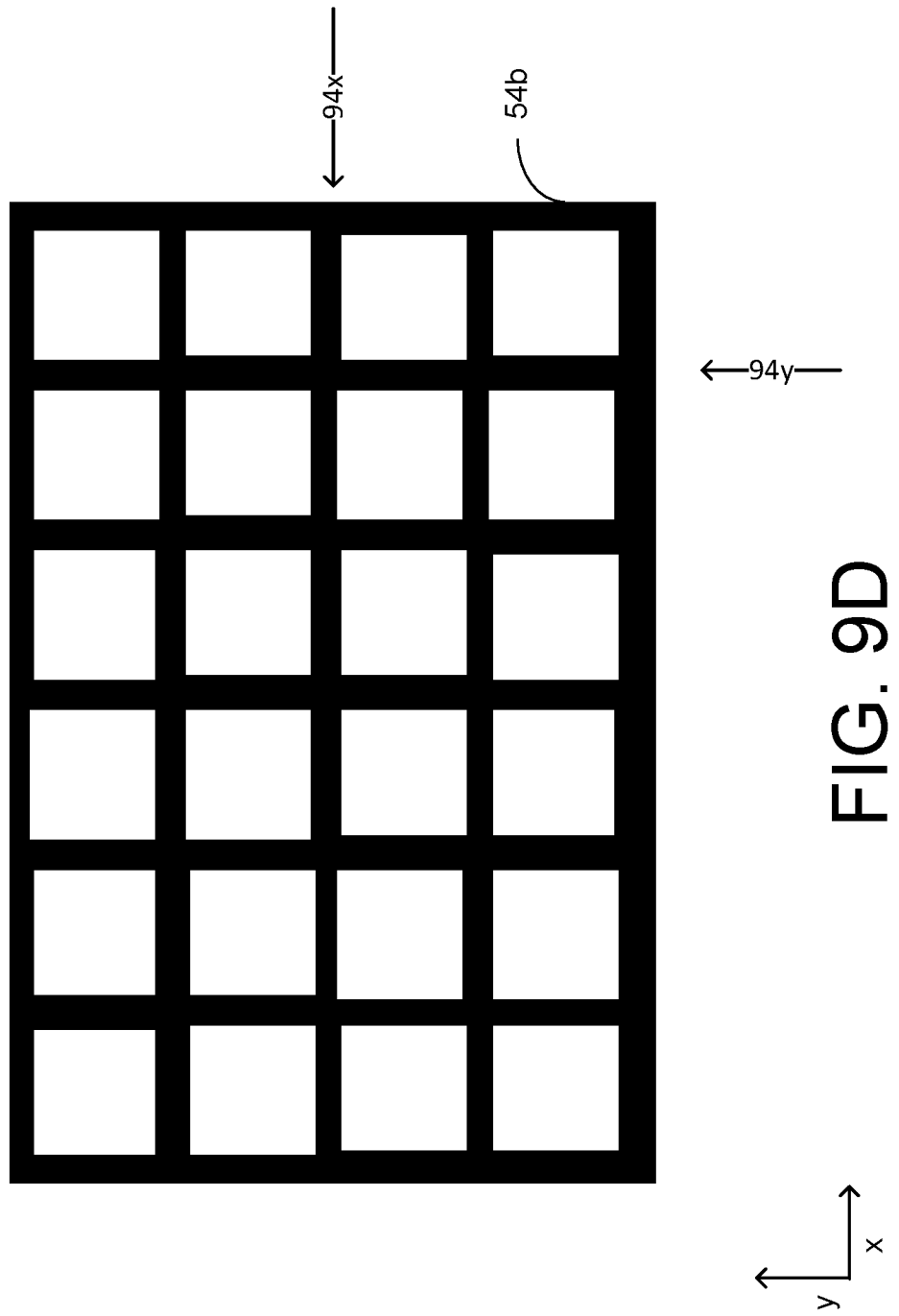

FIG. 9D shows a top view of a portion of the optical sensor die after elements (e.g., element 52*b* and element 54*b*) of light shield layer 60 are defined on the optical sensor die. In the portion of the of the optical sensor die shown in FIG. 9D only elements 54*b* are shown. These may form a container or a metal grid structure with lines of the elements (e.g., lines 94*x* and lines 94*y*) extending in the x and y direction, respectively, across the array of pixels (not shown) that is disposed at, or underneath surface S of the optical sensor die.

Figure 9E:
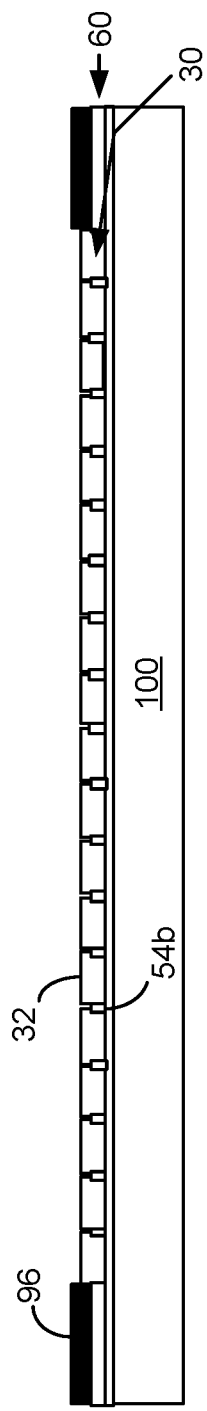

FIG. 9E shows, at a next stage of construction, a photo pattern of color filter resists (e.g., color filter array 30)) may be disposed on optical sensor die 100 between elements (e.g., element 54*b*) of light shield layer 60. Each color filter element (e.g., color filter 32) in the color filter array may be associated with a respective underlying photo-sensitive pixel (not shown). The photo pattern of color filter resists disposed on optical sensor die 100 in addition to color filter 32 may include a light blocking (LB) resist (e.g., LB element 96) disposed on edge block elements (element 52*b*) of light shield layer 60. The light blocking (LB) resist may, for example, be a black color dye or resist.

Figure 9F:
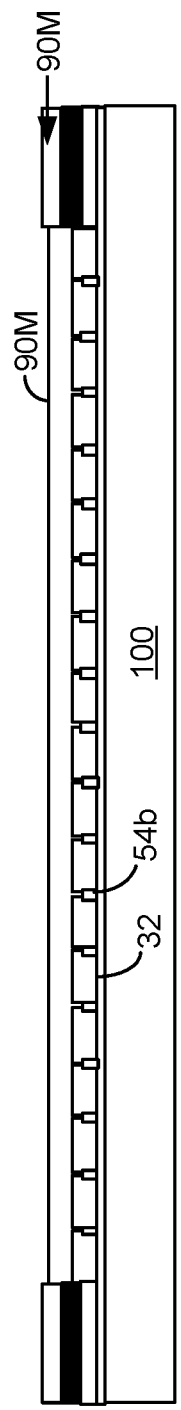

Next, as shown in FIG. 9F, a layer of micro lens fill material 90M is formed above the color filter array 30 and the light blocking (LB) resist (e.g., LB element 96) disposed on edge block elements.

Figure 9G:
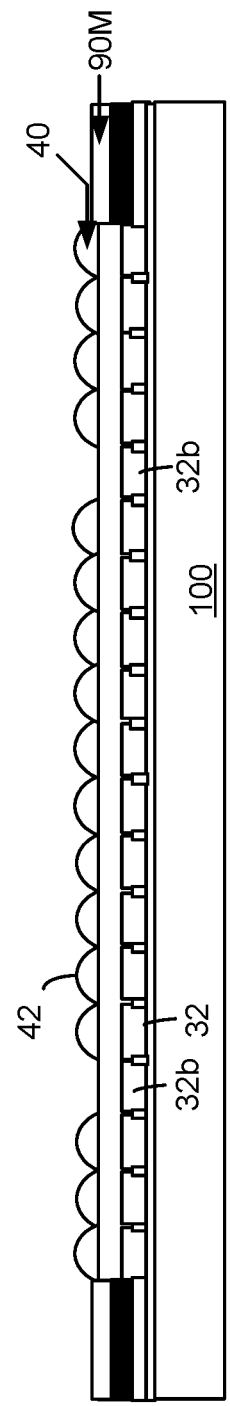

Further, as shown in FIG. 9G, a layer of micro lenses 40 is disposed on the layer of micro lens fill material 90M.

In some example implementations, layer of micro lenses 40 may include individual micro lens (e.g., micro lens 42) positioned above each color filter (and associated pixel underneath surface S) (as shown for example, in FIG. 1A). The micro lenses may be arranged as gapless micro lens or pincushion micro lens above the color filter array 30.

In some other example implementations, layer of micro lenses 40 may not include individual micro lens (e.g., micro lens 42) positioned above each color filter (and associated pixel underneath surface S). Layer of micro lenses 40 may omit or exclude micro lens (e.g., micro lens 42) positioned above some color filters (e.g., color filter 32*b*). The omitted color filters may correspond to space reserved for construction of elements (e.g., pillars, stand-off posts) of the support grid structure at further stages of construction.

Figure 9H:
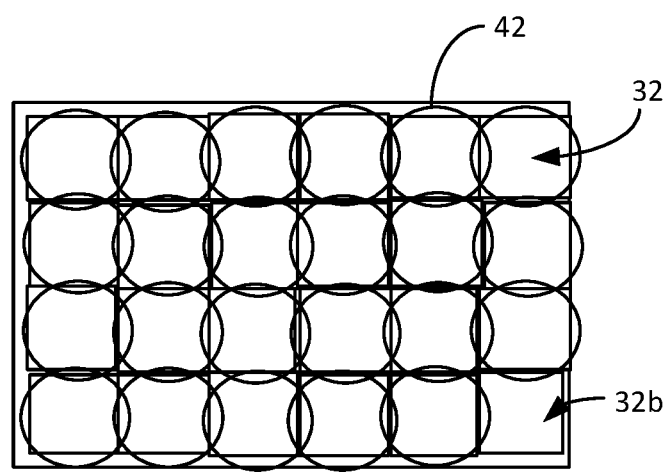

FIG. 9H shows a top view of a portion of the optical sensor die after layer of micro lenses 40 is formed over the array of color filters (color filter array 30). In the example shown in FIG. 9H, micro lenses (e.g., micro lens 42) are positioned over each color filter in a rectangular array of color filters (color filter 32) except, for example, over one color filter that is referenced as color filter 32*b* (shown in the right-hand bottom corner of the rectangular array of color filters).

In a next stage of construction, a layer of support material 50A (shown, e.g., in FIG. 7B) may be disposed over optical sensor die 100 and patterned (e.g., lithographically patterned) and etched to form elements (e.g., pillars, stand-off posts, edge blocks) of the support grid structure. These elements may be formed in the space reserved for construction of these elements (e.g., on color filters with omitted micro lens, at intersections of the color filters, etc.). In example implementations, the stand-off posts (e.g., stand-off post 74) may be formed on color filters with omitted micro lens, and pillars (e.g., pillar 54) may be formed at the intersections (some or all the intersections) of the color filters.

FIG. 9I shows for example, an optical sensor die 100 on which the elements of the fabricated support grid structure include edge blocks (e.g., edge block 52) and stand-off posts (e.g., stand-off post 74). At least a stand-off post 74 is fabricated above a color filter (e.g., color filter 32*b*) that has an omitted micro lens.

FIG. 9J shows for example, an optical sensor die 100 on which the elements of the fabricated support grid structure include edge blocks (e.g., edge block 52) and pillars (e.g., pillar 54). The pillars may be fabricated at intersections of adjacent micro lenses. In some implementations (as shown in FIG. 9J) the pillars may be formed at some but not all intersections of adjacent micro lenses in the array. In the example shown in FIG. 9J, pillars (e.g., pillar 54) are formed, for example, at every second intersection of adjacent micro lenses.

In some example implementations, an ARC layer may be disposed on the elements (e.g., pillars, stand-off posts, edge blocks) of the support grid structure formed on the optical sensor die. FIG. 9K shows for example, an ARC coating (e.g., ARC 58) applied to the top surfaces of edge block 52, pillar 54 and micro lens 42 fabricated on the optical sensor die (of FIG. 9J).

Figure 10A:
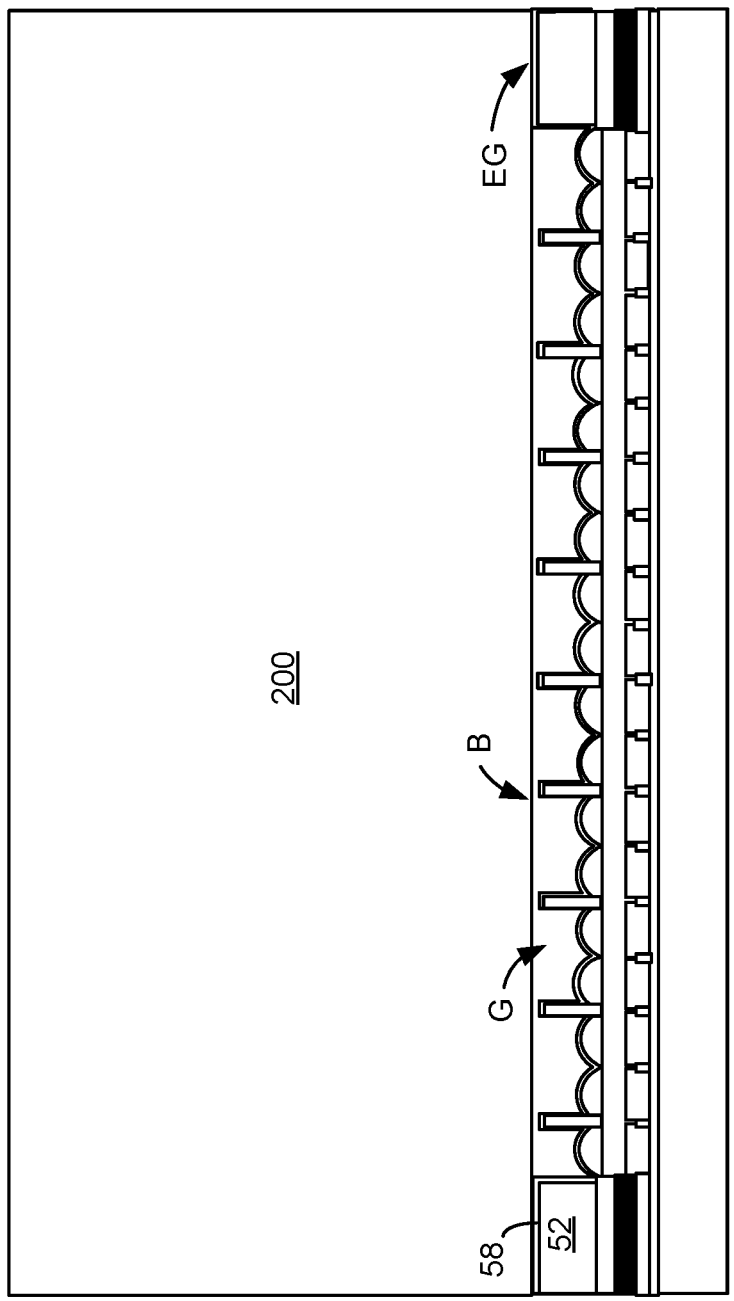
FIG. 10A illustrates a cross-sectional view of an optical sensor package in which a glass cover is bonded to a support grid structure.

FIG. 10A schematically shows a glass cover (e.g., glass cover 200) placed on the optical sensor die 100 shown in FIG. 9K while maintaining an air gap (air gap G) between the glass cover and the optical sensor die. As shown in FIG. 10A, glass cover 200 may be positioned so that edge portions (e.g., edge portion EG) of the bottom surface (surface B) of the glass cover are aligned with the top surfaces of the edge blocks (e.g., edge block 52) of support grid structure 50. The glass cover may be attached to support grid structure 50, for example, by oxide-oxide bonding between the top surfaces (e.g., surface 52*s*) of the edge blocks (e.g., edge block 52) and the bottom surface (surface B) of the glass cover. The oxide-oxide bonding (i.e., direct oxide bonding of glass to the $SiO_2$/ARC surface) of the edge blocks (e.g., edge block 52) may be accomplished via pressure and heat with elimination of $H_2O$.

In some implementations an adhesive layer can be used to attach glass cover 200 to the edge blocks (e.g., edge block 52) of support grid structure 50. FIG. 10B schematically shows a glass cover (e.g., glass cover 200) attached to the support grid structure of optical sensor die 100 (shown in FIG. 9K) using an adhesive (e.g., patterned adhesive element 210P).

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising," and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Some implementations may be implemented using various semiconductor processing and/or packaging techniques. Some implementations may be implemented using various types of semiconductor processing techniques associated with semiconductor substrates including, but not limited to, for example, Silicon (Si), Gallium Arsenide (GaAs), Gallium Nitride (GaN), Silicon Carbide (SiC) and/or so forth.

What is claimed is:

1. A package comprising:
   an optical sensor die having a surface including an optically active surface area (OASA) and an edge surface portion lying outside a perimeter of the OASA;
   a support grid structure disposed on the surface of the optical sensor die, the support grid structure including at least one pillar disposed within the OASA and an edge block disposed on the edge surface portion lying outside the perimeter of the OASA; and
   an optically transparent cover attached to the support grid structure, the edge block of the support grid structure supporting the optically transparent cover at a first height above the optical sensor die while maintaining an air gap between the optically transparent cover and the OASA, the at least one pillar having a second height equal to or less than the first height.

2. The package of claim 1, wherein a top surface of the edge block and a top surface of the at least one pillar are attached to a bottom surface of the optically transparent cover by one of oxide-to-oxide bonds or an adhesive layer.

3. The package of claim 2, wherein the adhesive layer is disposed on the bottom surface of the optically transparent cover.

4. The package of claim 3, wherein the adhesive layer includes patterned adhesive elements aligned with the top surface of the edge block and/or the top surface of the at least one pillar.

5. The package of claim 1, wherein the at least one pillar has a reduced height compared to a height of the edge block, and only a top surface of the edge block is attached to a bottom surface of the optically transparent cover by one of oxide-to-oxide bonds or an adhesive layer.

6. The package of claim 1, wherein a first conductive layer is disposed on a bottom surface of the optically transparent cover and a second conductive layer is disposed in the support grid structure, the first conductive layer and the second conductive layer forming a capacitive touch pressure sensor.

7. The package of claim 1, wherein the support grid structure is made of inorganic material including at least one of silicon oxide, silicon nitride, and silicon oxynitride.

8. The package of claim 1, wherein a respective element of a metal layer is disposed on the optical sensor die underneath the at least one pillar and underneath the edge block.

9. The package of claim 1, wherein the OASA includes:
   an array of photo-sensitive pixels;
   a layer of color filters, each color filter being associated with a respective photo-sensitive pixel; and
   a layer of micro lenses, each micro lens being associated with a respective color filter,
   wherein the at least one pillar is disposed at an intersection of four adjacent micro lenses.

10. The package of claim 1, wherein the OASA includes a layer of color filters, each color filter being associated with a respective photo-sensitive pixel, wherein at least one color filter in the layer of color filters is not associated with a respective micro lens, and wherein the at least one pillar is disposed within the OASA at the at least one color filter that is not associated with a respective micro lens.

11. The package of claim 1, wherein the OASA includes:
    an array of photo-sensitive pixels;
    a layer of color filters disposed above the array of photo-sensitive pixels, each color filter being associated with a respective photo-sensitive pixel; and
    a layer of micro lenses disposed above the array of photo-sensitive pixels, each micro lens being associated with a respective color filter.

12. The package of claim 1, wherein the edge block has a top surface and a top surface of the at least one spacer are attached to a bottom surface of the optically transparent cover by one of oxide-to-oxide bonds or an adhesive layer.

13. The package of claim 1, wherein only a top surface of the edge block is attached to a bottom surface of the optically transparent cover and the air gap is formed between a top surface of at least one spacer and bottom surface of the optically transparent cover.

14. The package of claim 1, wherein at least one spacer is disposed at an intersection of two adjacent micro lenses.

15. The package of claim 1, wherein at least one spacer is disposed at a color filter that does not have an associated micro lens.

16. The package of claim 1, wherein the support grid structure is made of inorganic material including at least one of silicon oxide, silicon nitride, and silicon oxynitride.

17. The package of claim 1, wherein a respective element of a metal layer is disposed on the optical sensor die underneath the-at least one spacer and underneath the edge block.

18. A method comprising:
    disposing a support grid structure on a surface of an optical sensor die, the surface including an optically active surface area (OASA) and an edge surface portion lying outside a perimeter of the OASA, the support grid structure including at least one pillar disposed within the OASA and an edge block disposed on the edge surface portion lying outside the perimeter of the OASA; and attaching an optically transparent cover to the support grid structure, the edge block of the support grid structure supporting the optically transparent cover at a first height above the optical sensor die while maintaining an air gap between the optically transparent cover and the OASA, the at least one pillar having a second height equal to or less than the first height.

19. The method of claim 18, wherein a top surface of the edge block and a top surface of the at least one pillar are attached to a bottom surface of the optically transparent cover by one of oxide-to-oxide bonds or an adhesive layer.

20. The method of claim 19, wherein the adhesive layer is disposed on the bottom surface of the optically transparent cover.

21. The method of claim 20, wherein the adhesive layer includes patterned adhesive elements aligned with the top surface of the edge block and/or the top surface of the at least one pillar.

22. The method of claim 18, wherein the at least one pillar has a reduced height compared to a height of the edge block, and only a top surface of the edge block is attached to a bottom surface of the optically transparent cover by one of oxide-to-oxide bonds or an adhesive layer.

23. The method of claim 18, further comprising: disposing a first conductive layer on a bottom surface of the optically transparent cover and disposing a second conductive layer in the support grid structure, the first conductive layer and the second conductive layer forming a capacitive touch pressure sensor.

* * * * *